United States Patent
Hendry

(10) Patent No.: US 11,601,658 B2
(45) Date of Patent: Mar. 7, 2023

(54) PH NAL UNIT CODING-RELATED IMAGE DECODING METHOD, AND DEVICE FOR SAME

(71) Applicant: LG Electronics Inc., Seoul (KR)

(72) Inventor: Hendry Hendry, Seoul (KR)

(73) Assignee: LG Electronics Inc., Seoul (KR)

(\*) Notice: Subject to any disclaimer, the term of this patent is extended or adjusted under 35 U.S.C. 154(b) by 0 days.

(21) Appl. No.: 17/708,573

(22) Filed: Mar. 30, 2022

(65) Prior Publication Data
US 2022/0224921 A1 Jul. 14, 2022

Related U.S. Application Data

(63) Continuation of application No. PCT/KR2020/019322, filed on Dec. 29, 2020.

(60) Provisional application No. 62/956,624, filed on Jan. 2, 2020.

(51) Int. Cl.
| | | |
|---|---|---|
| *H04N 19/169* | (2014.01) | |
| *H04N 19/172* | (2014.01) | |
| *H04N 19/174* | (2014.01) | |
| *H04N 19/30* | (2014.01) | |
| *H04N 19/70* | (2014.01) | |

(52) U.S. Cl.
CPC ......... *H04N 19/188* (2014.11); *H04N 19/172* (2014.11); *H04N 19/174* (2014.11); *H04N 19/30* (2014.11); *H04N 19/70* (2014.11)

(58) Field of Classification Search
CPC ........................... H04N 19/70; H04N 19/188
See application file for complete search history.

(56) References Cited

U.S. PATENT DOCUMENTS

| | | | |
|---|---|---|---|
| 9,560,367 B2 | 1/2017 | Wang et al. | |
| 2021/0144384 A1* | 5/2021 | Sjöberg | H04N 19/70 |

FOREIGN PATENT DOCUMENTS

| | | |
|---|---|---|
| KR | 20130118253 | 10/2013 |
| KR | 101625724 | 6/2016 |
| KR | 101762521 | 7/2017 |

OTHER PUBLICATIONS

Sjöberg et al., "AHG9: Picture header enabled flag," JVET-Q0426-v1, Presented at Joint Video Experts Team (JVET) of ITU-T SG 16 WP 3 and ISO/IEC JTC 1/SC 29/WG 11, 17th Meeting: Brussels, BE, Jan. 7-17, 2020, 15 pages.

\* cited by examiner

*Primary Examiner* — Jerry T Jean Baptiste
(74) *Attorney, Agent, or Firm* — Fish & Richardson P.C.

(57) ABSTRACT

An image decoding method performed by a decoding device according to the present document is characterized by comprising the steps of: acquiring a flag indicating whether a picture header (PH) network abstraction layer (NAL) unit including a PH for the current picture is present; acquiring a video coding layer (VCL) NAL unit including a slice header and slice data for the current slice of the current picture; acquiring the PH on the basis of the flag; and decoding the current picture on the basis of the PH, the slice header, and the slice data.

12 Claims, 15 Drawing Sheets

PH NAL UNIT CODING-RELATED IMAGE DECODING METHOD, AND DEVICE FOR SAME

CROSS-REFERENCE TO RELATED APPLICATIONS

Pursuant to 35 U.S.C. § 119(e), this application is a continuation of International Application PCT/KR2020/019322, with an international filing date of Dec. 29, 2020, which claims the benefit of U.S. Provisional Patent Application No. 62/956,624, filed on Jan. 2, 2020, the contents of which are hereby incorporated by reference herein in their entirety.

BACKGROUND OF THE DISCLOSURE

Field of the Disclosure

The present disclosure relates to image coding technology, and more specifically, to a video decoding method and apparatus for adaptively coding a PH NAL unit in an image coding system.

Related Art

Recently, demand for high-resolution, high-quality images, such as High Definition (HD) images and Ultra High Definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

SUMMARY

A technical object of the present disclosure is to provide a method and apparatus for improving image coding efficiency.

Another technical object of the present disclosure is to provide a method and an apparatus for coding a flag indicating presence or absence of a PH NAL unit.

According to an embodiment of the present disclosure, an image decoding method performed by a decoding apparatus is provided. The method includes obtaining a flag for whether a Picture Header (PH) Network Abstraction Layer (NAL) unit including a PH for a current picture is present, obtaining a Video Coding Layer (VCL) NAL unit including a slice header and slice data for a current slice in the current picture, obtaining the PH based on the flag, and decoding the current picture based on the PH, the slice header and the slice data.

According to another embodiment of the present disclosure, a decoding apparatus performing image decoding is provided. The decoding apparatus includes an entropy decoder configured to obtain a flag for whether a Picture Header (PH) Network Abstraction Layer (NAL) unit including a PH for a current picture is present, to obtain a Video Coding Layer (VCL) NAL unit including a slice header and slice data for a current slice in the current picture, and to obtain the PH based on the flag, and a predictor configured to decode the current picture based on the PH, the slice header and the slice data.

According to another embodiment of the present disclosure, a video encoding method performed by an encoding apparatus is provided. The method includes generating a Video Coding Layer (VCL) Network Abstraction Layer (NAL) unit including a slice header and slice data for a slice in a current picture, determining whether a Picture Header (PH) NAL unit including a PH for the current picture is present, generating the PH and a flag for whether the PH NAL unit is present based on a result of the determination, and encoding image information including the VCL NAL unit, the PH and the flag.

According to another embodiment of the present disclosure, a video encoding apparatus is provided. The encoding apparatus includes an entropy encoder configured to generate a Video Coding Layer (VCL) Network Abstraction Layer (NAL) unit including a slice header and slice data for a slice in a current picture, to determine whether a Picture Header (PH) NAL unit including a PH for the current picture is present, to generate the PH and a flag for whether the PH NAL unit is present based on a result of the determination, and to encode image information including the VCL NAL unit, the PH and the flag.

According to another embodiment of the present disclosure, a computer-readable digital storage medium storing a bitstream including image information and causing an image decoding method to be executed is provided. In the computer-readable digital storage medium, the image decoding method includes obtaining a flag for whether a Picture Header (PH) Network Abstraction Layer (NAL) unit including a PH for a current picture is present, obtaining a Video Coding Layer (VCL) NAL unit including a slice header and slice data for a current slice in the current picture, obtaining the PH based on the flag, and decoding the current picture based on the PH, the slice header and the slice data.

According to the present disclosure, it is possible to signal a flag indicating presence or absence of a PH NAL unit, control a NAL unit adaptively to a bit rate of a bitstream based on the flag and improve overall coding efficiency.

According to the present disclosure, it is possible to set constraints on the number of slices in a current picture and constraints on presence of a PH NAL unit for related pictures based on a flag indicating presence or absence of a PH NAL unit to control a NAL unit adaptively to a bit rate of a bitstream, improving overall coding efficiency.

DESCRIPTION OF EMBODIMENTS

Figure 1:
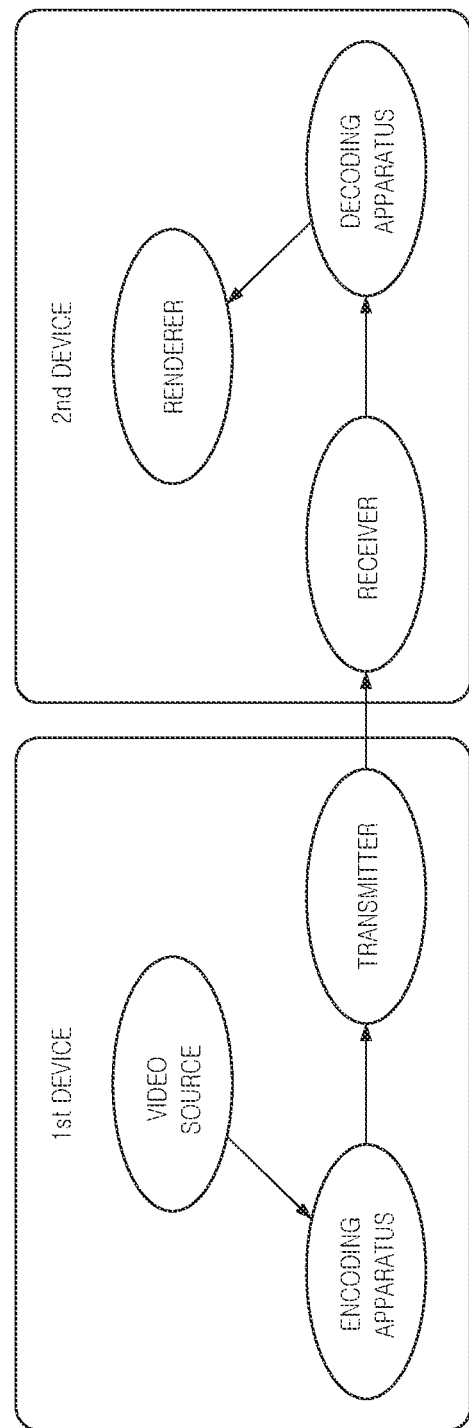
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. In addition, a subpicture may represent a rectangular region of one or more slices within a picture. That is, a subpicture contains one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present description, "A or B" may mean "only A", "only B" or "both A and B". In other words, in the present specification, "A or B" may be interpreted as "A and/or B". For example, "A, B or C" herein means "only A", "only B", "only C", or "any and any combination of A, B and C".

A slash (/) or a comma (comma) used in the present description may mean "and/or". For example, "A/B" may mean "A and/or B". Accordingly, "A/B" may mean "only A", "only B", or "both A and B". For example, "A, B, C" may mean "A, B, or C".

In the present description, "at least one of A and B" may mean "only A", "only B", or "both A and B". In addition, in the present description, the expression "at least one of A or B" or "at least one of A and/or B" may be interpreted the same as "at least one of A and B".

In addition, in the present description, "at least one of A, B and C" means "only A", "only B", "only C", or "any combination of A, B and C". Also, "at least one of A, B or C" or "at least one of A, B and/or C" may mean "at least one of A, B and C".

In addition, parentheses used in the present description may mean "for example". Specifically, when "prediction (intra prediction)" is indicated, "intra prediction" may be proposed as an example of "prediction". In other words, "prediction" in the present description is not limited to "intra prediction", and "intra prediction" may be proposed as an example of "prediction". Also, even when "prediction (i.e., intra prediction)" is indicated, "intra prediction" may be proposed as an example of "prediction".

In the present description, technical features that are individually described within one drawing may be implemented individually or may be implemented at the same time.

The following drawings were created to explain a specific example of the present description. Since the names of specific devices described in the drawings or the names of specific signals/messages/fields are presented by way of example, the technical features of the present description are not limited to the specific names used in the following drawings.

Figure 2:
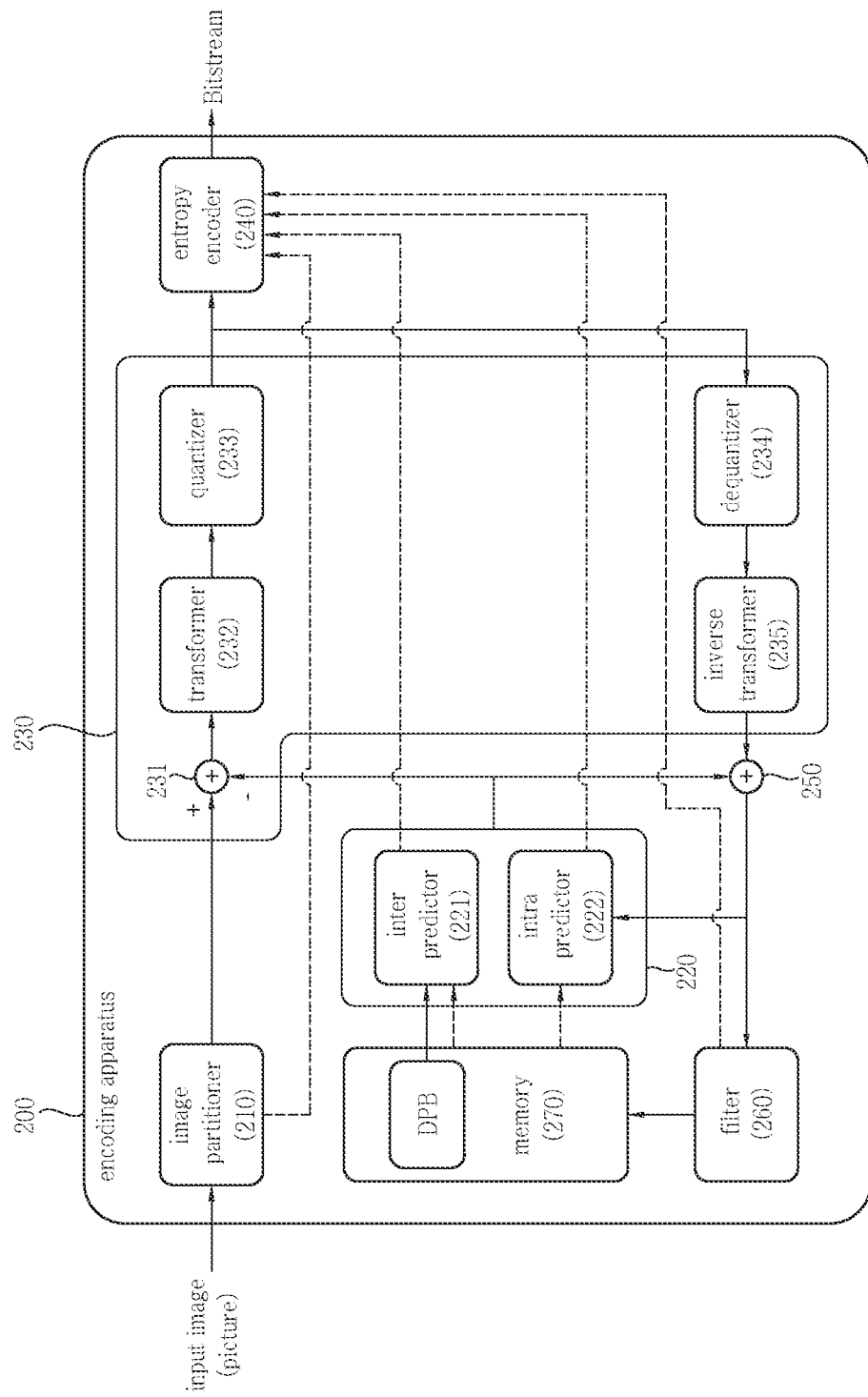
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form.

Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
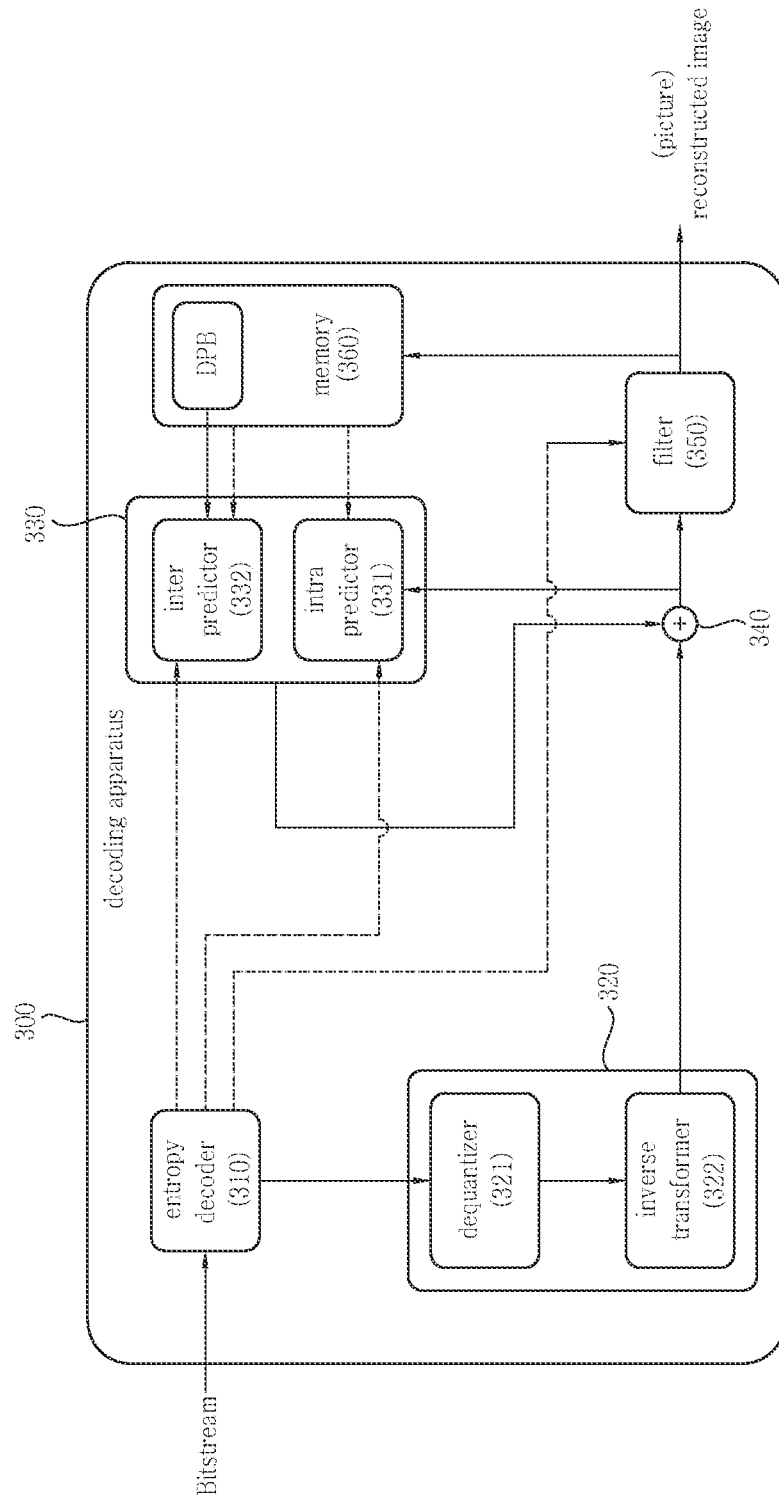
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

In the present disclosure, at least one of quantization/inverse quantization and/or transform/inverse transform may be omitted. When the quantization/inverse quantization is omitted, the quantized transform coefficients may be called transform coefficients. When the transform/inverse transform is omitted, the transform coefficients may be called coefficients or residual coefficients, or may still be called transform coefficients for uniformity of expression.

In the present disclosure, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or the information on the transform coefficient(s)), and scaled transform coefficients may be derived by inverse transforming (scaling) on the transform coefficients. Residual samples may be derived based on the inverse transforming (transforming) on the scaled transform coefficients. This may be applied/expressed in other parts of the present disclosure as well.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Intra prediction may refer to prediction that generates prediction samples for a current block based on reference samples in a picture to which the current block belongs (hereinafter, referred to as a current picture). When the intra prediction is applied to the current block, neighboring reference samples to be used for the intra prediction of the current block may be derived. The neighboring reference samples of the current block may include a sample adjacent to the left boundary of the current block of size nW×nH and a total of 2×nH samples adjacent to the bottom-left of the current block, a sample adjacent to the top boundary of the current block and a total of 2×nW samples adjacent to the top-right and a sample adjacent to the top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to the right boundary of the current block of size nW×nH, a total of nW samples adjacent to the bottom boundary of the current block and a sample adjacent to the bottom-right of the current block.

However, some of the neighboring reference samples of the current block have not yet been decoded or may not be available. In this case, the decoder may construct neighboring reference samples to be used for prediction by substituting unavailable samples with available samples. Alternatively, neighboring reference samples to be used for prediction may be configured through interpolation of available samples.

When the neighboring reference samples are derived, (i) a prediction sample may be derived based on the average or interpolation of neighboring reference samples of the current block, or (ii) the prediction sample may be derived based on a reference sample existing in a specific (prediction) direction with respect to a prediction sample among the neighboring reference samples of the current block. The case of (i)

may be called a non-directional mode or a non-angular mode, and the case of (ii) may be called a directional mode or an angular mode.

In addition, the prediction sample may be generated through interpolation of a first neighboring sample located in the prediction direction of the intra prediction mode of the current block based on the prediction sample of the current block and a second neighboring sample located in a direction opposite to the prediction direction among the neighboring reference samples. The above-described case may be referred to as linear interpolation intra prediction (LIP). In addition, chroma prediction samples may be generated based on the luma samples using a linear model (LM). This case may be called an LM mode or a chroma component LM (CCLM) mode.

In addition, a temporary prediction sample of the current block is derived based on the filtered neighboring reference samples, and a prediction sample of the current block may also be derived by weighted summing the temporary prediction sample and at least one reference sample derived according to the intra prediction mode among the existing neighboring reference samples, that is, unfiltered neighboring reference samples. The above-described case may be referred to as position dependent intra prediction (PDPC).

In addition, a reference sample line with the highest prediction accuracy among neighboring multiple reference sample lines of the current block is selected, and a prediction sample is derived using a reference sample located in the prediction direction in the selected line. In this case, intra prediction encoding may be performed by indicating (signaling) the used reference sample line to the decoding apparatus. The above-described case may be referred to as multi-reference line intra prediction or MRL-based intra prediction.

In addition, the current block is divided into vertical or horizontal sub-partitions and intra prediction is performed based on the same intra prediction mode, but neighboring reference samples may be derived and used in units of the sub-partitions. That is, in this case, the intra prediction mode for the current block is equally applied to the sub-partitions, but the intra prediction performance may be improved in some cases by deriving and using the neighboring reference samples in units of the sub-partitions. This prediction method may be called intra-prediction based on intra sub-partitions (ISP).

The above-described intra prediction methods may be called intra prediction types to be distinguished from the intra prediction mode. The intra prediction types may be referred to by various terms such as intra prediction technique or additional intra prediction modes. For example, the intra prediction types (or additional intra prediction modes, etc.) may include at least one of the aforementioned LIP, PDPC, MRL, and ISP. A general intra prediction method excluding a specific intra prediction type such as LIP, PDPC, MRL, and ISP may be referred to as a normal intra prediction type. The normal intra prediction type may be generally applied when the above specific intra prediction type is not applied, and prediction may be performed based on the above-described intra prediction mode. Meanwhile, if necessary, post-processing filtering may be performed on the derived prediction sample.

Specifically, the intra prediction process may include an intra prediction mode/type determination step, neighboring reference samples derivation step, and an intra prediction mode/type based prediction sample derivation step. In addition, if necessary, a post-filtering step may be performed on the derived prediction sample.

When intra prediction is applied, an intra prediction mode applied to the current block may be determined using an intra prediction mode of a neighboring block. For example, the decoding device may select one of most probable mode (MPM) candidates in the MPM list derived based on additional candidate modes and an intra prediction mode of the neighboring block (e.g., the left and/or top neighboring block) of the current block, or select one of the remaining intra prediction modes not included in the MPM candidates (and planar mode) based on the remaining intra prediction mode information. The MPM list may be configured to include or not include the planner mode as a candidate. For example, when the MPM list includes a planner mode as a candidate, the MPM list may have 6 candidates, and when the MPM list does not include a planner mode as a candidate, the MPM list may have 5 candidates. When the MPM list does not include the planar mode as a candidate, a not planar flag (e.g., intra_luma_not_planar_flag) representing whether the intra prediction mode of the current block is not the planar mode may be signaled. For example, the MPM flag may be signaled first, and the MPM index and not planner flag may be signaled when the value of the MPM flag is 1. Also, the MPM index may be signaled when the value of the not planner flag is 1. Here, the fact that the MPM list is configured not to include the planner mode as a candidate is that the planner mode is always considered as MPM rather than that the planner mode is not MPM, thus, the flag (not planar flag) is signaled first to check whether it is the planar mode.

For example, whether the intra prediction mode applied to the current block is among the MPM candidates (and the planar mode) or the remaining modes may be indicated based on the MPM flag (e.g., intra_luma_mpm_flag). The MPM flag with a value of 1 may indicate that the intra prediction mode for the current block is within MPM candidates (and planar mode), and The MPM flag with a value of 0 may indicate that the intra prediction mode for the current block is not within MPM candidates (and planar mode). The not planar flag (e.g., intra_luma_not_planar_flag) with a value of 0 may indicate that the intra prediction mode for the current block is a planar mode, and the not planar flag with a value of 1 may indicate that the intra prediction mode for the current block is not the planar mode. The MPM index may be signaled in the form of an mpm_idx or intra_luma_mpm_idx syntax element, and the remaining intra prediction mode information may be signaled in the form of a rem_intra_luma_pred_mode or intra_luma_mpm_remainder syntax element. For example, the remaining intra prediction mode information may indicate one of the remaining intra prediction modes not included in the MPM candidates (and planar mode) among all intra prediction modes by indexing in the order of prediction mode number. The intra prediction mode may be an intra prediction mode for a luma component (sample). Hereinafter, the intra prediction mode information may include at least one of the MPM flag (e.g., intra_luma_mpm_flag), the not planar flag (e.g., intra_luma_not_planar_flag), the MPM index (e.g., mpm_idx or intra_luma_mpm_idx), or the remaining intra prediction mode information (rem_intra_luma_luma_mpm_mode or intra_luma_mpminder). In the present disclosure, the MPM list may be referred to by various terms such as an MPM candidate list and candModeList. When the MIP is applied to the current block, a separate MPM flag (e.g., intra_mip_mpm_flag) for the MIP, an MPM index (e.g., intra_mip_mpm_idx), and remaining intra prediction mode information (e.g., intra_mip_mpm_remainder) may be signaled, and the not planar flag may not be signaled.

In other words, in general, when a block partition for an image is performed, the current block to be coded and a neighboring block have similar image characteristics. Therefore, there is a high probability that the current block and the neighboring block have the same or similar intra prediction mode. Accordingly, the encoder may use the intra prediction mode of the neighboring block to encode the intra prediction mode of the current block.

For example, the decoding device/encoding device may construct a most probable modes (MPM) list for the current block. The MPM list may be referred to as the MPM candidate list. Here, the MPM may refer to modes used to improve coding efficiency in consideration of the similarity between the current block and the neighboring blocks during intra prediction mode coding. As described above, the MPM list may be constructed to include the planar mode, or may be constructed to exclude the planar mode. For example, when the MPM list includes the planar mode, the number of candidates in the MPM list may be 6. And, when the MPM list does not include the planar mode, the number of candidates in the MPM list may be 5.

The encoder/decoder may construct an MPM list including five or six MPMs.

In order to construct the MPM list, three types of modes, such as default intra modes, neighbor intra modes, and derived intra modes, may be considered.

For the neighbor intra modes, two neighbor blocks, that is, a left neighbor block and a top neighbor block, may be considered.

As described above, if the MPM list is constructed to not include a planar mode, the planar mode may be excluded from the list, and the number of MPM list candidates may be set to five.

Furthermore, a non-directional mode (or a non-angle mode) among the intra prediction modes may include a DC mode based on an average of neighbor reference samples of a current block or an interpolation-based planar mode.

Meanwhile, when inter prediction is applied, the predictor of the encoding apparatus/decoding apparatus may derive prediction samples by performing inter prediction in units of blocks. The inter prediction may be applied when performing the prediction on the current block. That is, the predictor (more specifically, inter predictor) of the encoding/decoding apparatus may derive prediction samples by performing the inter prediction in units of the block. The inter prediction may represent prediction derived by a method dependent to the data elements (e.g., sample values or motion information) of a picture(s) other than the current picture. When the inter prediction is applied to the current block, a predicted block (prediction sample array) for the current block may be derived based on a reference block (reference sample array) specified by the motion vector on the reference picture indicated by the reference picture index. In this case, in order to reduce an amount of motion information transmitted in the inter-prediction mode, the motion information of the current block may be predicted in units of a block, a subblock, or a sample based on a correlation of the motion information between the neighboring block and the current block. The motion information may include the motion vector and the reference picture index. The motion information may further include inter-prediction type (L0 prediction, L1 prediction, Bi prediction, etc.) information. In the case of applying the inter prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list may be configured based on the neighboring blocks of the current block and a flag or index information indicating which candidate is selected (used) may be signaled in order to derive the motion vector and./or reference picture index of the current block. The inter prediction may be performed based on various prediction modes and for example, in the case of a skip mode and a merge mode, the motion information of the current block may be the same as the motion information of the selected neighboring block. In the case of the skip mode, the residual signal may not be transmitted unlike the merge mode. In the case of a motion vector prediction (MVP) mode, the motion vector of the selected neighboring block may be used as a motion vector predictor and a motion vector difference may be signaled. In this case, the motion vector of the current block may be derived by using a sum of the motion vector predictor and the motion vector difference.

The motion information may further include L0 motion information and/or L1 motion information according to the inter-prediction type (L0 prediction, L1 prediction, Bi prediction, etc.). A L0-direction motion vector may be referred to as an L0 motion vector or MVL0 and an L1-direction motion vector may be referred to as an L1 motion vector or MVL1. A prediction based on the L0 motion vector may be referred to as an L0 prediction, a prediction based on the L1 motion vector may be referred to as an L1 prediction, and a prediction based on both the L0 motion vector and the L1 motion vector may be referred to as a bi-prediction. Here, the L0 motion vector may indicate a motion vector associated with a reference picture list L0 and the L1 motion vector may indicate a motion vector associated with a reference picture list L1. The reference picture list L0 may include pictures prior to the current picture in an output order and the reference picture list L1 may include pictures subsequent to the current picture in the output order, as the reference pictures. The prior pictures may be referred to as a forward (reference) picture and the subsequent pictures may be referred to as a reverse (reference) picture. The reference picture list L0 may further include the pictures subsequent to the current picture in the output order as the reference pictures. In this case, the prior pictures may be first indexed in the reference picture list L0 and the subsequent pictures may then be indexed. The reference picture list L1 may further include the pictures prior to the current picture in the output order as the reference pictures. In this case, the subsequent pictures may be first indexed in the reference picture list L1 and the prior pictures may then be indexed. Here, the output order may correspond to a picture order count (POC) order.

A video/image encoding process based on inter prediction may schematically include, for example, the following.

Figure 4:
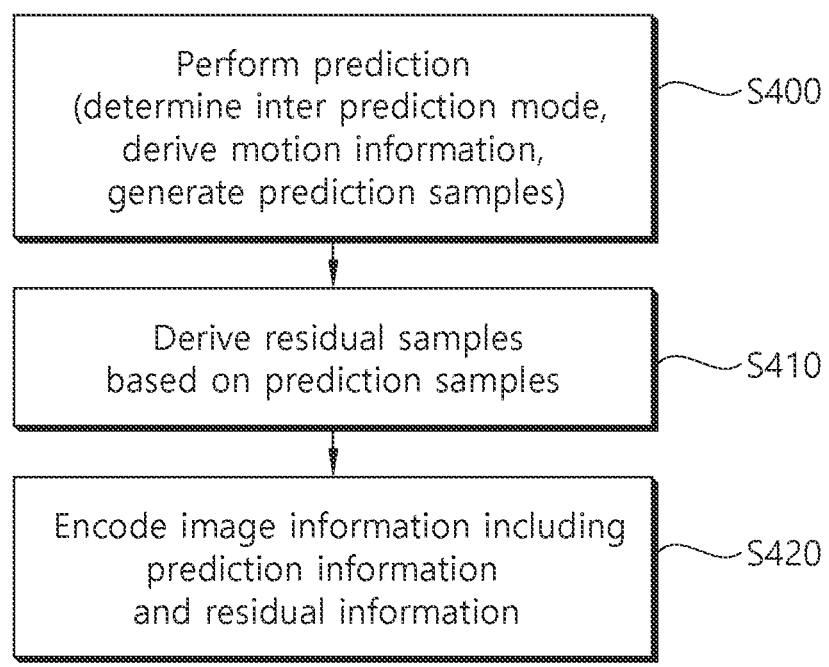
FIG. 4 illustrates an example of an inter prediction-based video/image encoding method.

FIG. 4 illustrates an example of an inter prediction-based video/image encoding method.

The encoding apparatus performs the inter prediction for the current block (S400). The encoding apparatus may derive the inter prediction mode and the motion information of the current block and generate the prediction samples of the current block. Here, an inter prediction mode determining process, a motion information deriving process, and a generation process of the prediction samples may be simultaneously performed and any one process may be performed earlier than other process. For example, the inter-prediction unit of the encoding apparatus may include a prediction mode determination unit, a motion information derivation unit, and a prediction sample derivation unit, and the prediction mode determination unit may determine the prediction mode for the current block, the motion information derivation unit may derive the motion information of the current block, and the prediction sample derivation unit may derive the prediction samples of the current block. For example, the inter-prediction unit of the encoding apparatus may search a block similar to the current block in a predetermined area (search area) of reference pictures through motion estimation and derive a reference block in which a difference from the current block is minimum or is equal to or less than a predetermined criterion. A reference picture index indicating a reference picture at which the reference block is positioned may be derived based thereon and a motion vector may be derived based on a difference in location between the reference block and the current block. The encoding apparatus may determine a mode applied to the current block among various prediction modes. The encoding apparatus may compare RD cost for the various prediction modes and determine an optimal prediction mode for the current block.

For example, when the skip mode or the merge mode is applied to the current block, the encoding apparatus may configure a merging candidate list to be described below and derive a reference block in which a difference from the current block is minimum or is equal to or less than a predetermined criterion among reference blocks indicated by merge candidates included in the merging candidate list. In this case, a merge candidate associated with the derived reference block may be selected and merge index information indicating the selected merge candidate may be generated and signaled to the decoding apparatus. The motion information of the current block may be derived by using the motion information of the selected merge candidate.

As another example, when an (A)MVP mode is applied to the current block, the encoding apparatus may configure an (A)MVP candidate list to be described below and use a motion vector of a selected mvp candidate among motion vector predictor (mvp) candidates included in the (A)MVP candidate list as the mvp of the current block. In this case, for example, the motion vector indicating the reference block derived by the motion estimation may be used as the motion vector of the current block and an mvp candidate having a motion vector with a smallest difference from the motion vector of the current block among the mvp candidates may become the selected mvp candidate. A motion vector difference (MVD) which is a difference obtained by subtracting the mvp from the motion vector of the current block may be derived. In this case, the information on the MVD may be signaled to the decoding apparatus. Further, when the (A)MVP mode is applied, the value of the reference picture index may be configured as reference picture index information and separately signaled to the decoding apparatus.

The encoding apparatus may derive the residual samples based on the predicted samples (S410). The encoding apparatus may derive the residual samples by comparing original samples and the prediction samples of the current block.

The encoding apparatus encodes image information including prediction information and residual information (S420). The encoding apparatus may output the encoded image information in the form of a bit stream. The prediction information may include information on prediction mode information (e.g., skip flag, merge flag or mode index, etc.) and information on motion information as information related to the prediction procedure. The information on the motion information may include candidate selection information (e.g., merge index, mvp flag or mvp index) which is information for deriving the motion vector. Further, the information on the motion information may include the information on the MVD and/or the reference picture index information. Further, the information on the motion information may include information indicating whether to apply the L0 prediction, the L1 prediction, or the bi-prediction. The residual information is information on the residual samples. The residual information may include information on quantized transform coefficients for the residual samples.

An output bit stream may be stored in a (digital) storage medium and transferred to the decoding apparatus or transferred to the decoding apparatus via the network.

Meanwhile, as described above, the encoding apparatus may generate a reconstructed picture (including reconstructed samples and reconstructed blocks) based on the reference samples and the residual samples. This is to derive the same prediction result as that performed by the decoding apparatus, and as a result, coding efficiency may be increased. Accordingly, the encoding apparatus may store the reconstruction picture (or reconstruction samples or reconstruction blocks) in the memory and utilize the reconstruction picture as the reference picture. The in-loop filtering process may be further applied to the reconstruction picture as described above.

A video/image decoding process based on inter prediction may schematically include, for example, the following.

Figure 5:
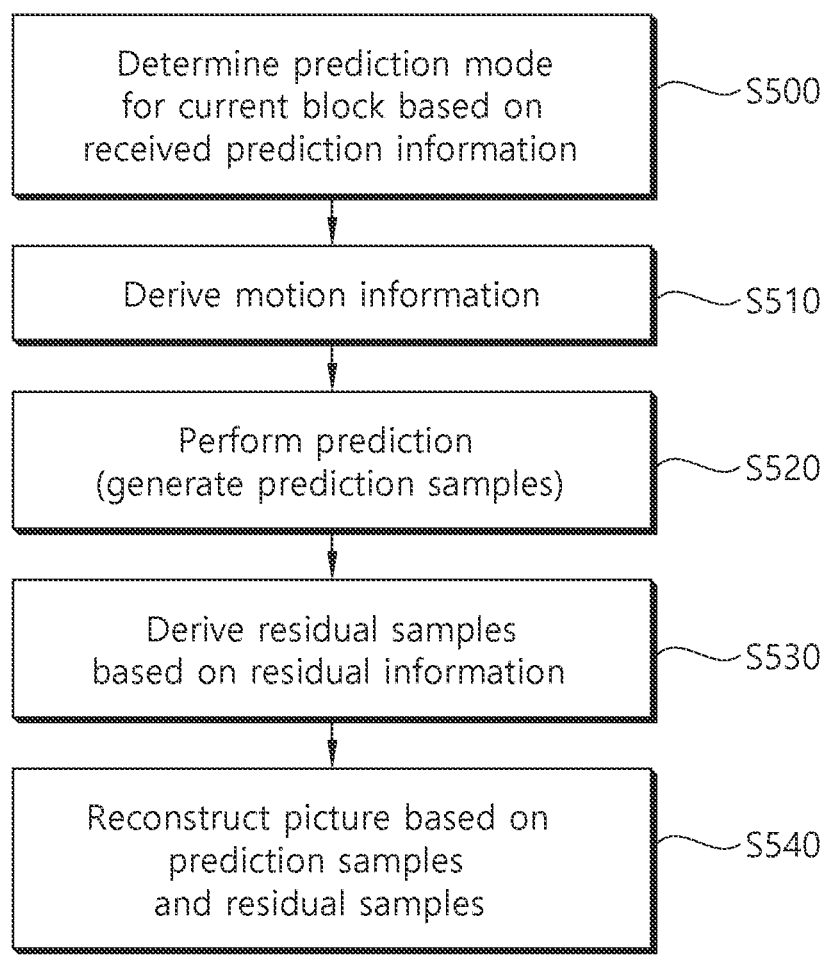
FIG. 5 illustrates an example of an inter prediction-based video/image decoding method.

FIG. 5 illustrates an example of an inter prediction-based video/image decoding method.

Referring to FIG. 5, the decoding apparatus may perform an operation corresponding to the operation performed by the encoding apparatus. The decoding apparatus may perform the prediction for the current block based on received prediction information and derive the prediction samples.

Specifically, the decoding apparatus may determine the prediction mode for the current block based on the received prediction information (S500). The decoding apparatus may determine which inter prediction mode is applied to the current block based on the prediction mode information in the prediction information.

For example, it may be determined whether the merge mode or the (A)MVP mode is applied to the current block based on the merge flag. Alternatively, one of various inter prediction mode candidates may be selected based on the mode index. The inter prediction mode candidates may include a skip mode, a merge mode, and/or an (A)MVP mode or may include various inter prediction modes to be described below.

The decoding apparatus derives the motion information of the current block based on the determined inter prediction mode (S510). For example, when the skip mode or the merge mode is applied to the current block, the decoding apparatus may configure the merge candidate list to be described below and select one merge candidate among the merge candidates included in the merge candidate list. Here, the selection may be performed based on the selection information (merge index). The motion information of the current block may be derived by using the motion information of the selected merge candidate. The motion information of the selected merge candidate may be used as the motion information of the current block.

As another example, when an (A)MVP mode is applied to the current block, the decoding apparatus may configure an (A)MVP candidate list to be described below and use a motion vector of a selected mvp candidate among motion vector predictor (mvp) candidates included in the (A)MVP candidate list as the mvp of the current block. Here, the selection may be performed based on the selection information (mvp flag or mvp index). In this case, the MVD of the current block may be derived based on the information on the MVD, and the motion vector of the current block may be derived based on the mvp of the current block and the MVD. Further, the reference picture index of the current block may be derived based on the reference picture index information. The picture indicated by the reference picture index in the reference picture list for the current block may be derived as the reference picture referred for the inter prediction of the current block.

Meanwhile, as described below, the motion information of the current block may be derived without a candidate list configuration and in this case, the motion information of the current block may be derived according to a procedure disclosed in the prediction mode. In this case, the candidate list configuration may be omitted.

The decoding apparatus may generate the prediction samples for the current block based on the motion information of the current block (S520). In this case, the reference picture may be derived based on the reference picture index of the current block and the prediction samples of the current block may be derived by using the samples of the reference block indicated by the motion vector of the current block on the reference picture. In this case, in some cases, a predicted sample filtering procedure for all or some of the prediction samples of the current block may be further performed.

For example, the inter-prediction unit of the decoding apparatus may include a prediction mode determination unit, a motion information derivation unit, and a prediction sample derivation unit, and the prediction mode determination unit may determine the prediction mode for the current block based on the received prediction mode information, the motion information derivation unit may derive the motion information (the motion vector and/or reference picture index) of the current block based on the information on the received motion information, and the prediction sample derivation unit may derive the predicted samples of the current block.

The decoding apparatus generates the residual samples for the current block based on the received residual information (S530). The decoding apparatus may generate the reconstruction samples for the current block based on the prediction samples and the residual samples and generate the reconstruction picture based on the generated reconstruction samples (S540). Thereafter, the in-loop filtering procedure may be further applied to the reconstruction picture as described above.

Figure 6:
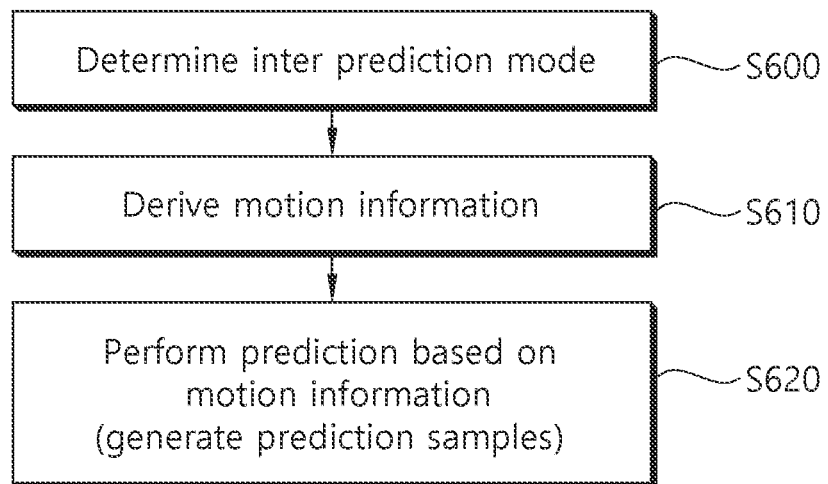
FIG. 6 schematically shows an inter prediction procedure.

FIG. 6 schematically shows an inter prediction procedure.

Referring to FIG. 6, as described above, the inter prediction process may include an inter prediction mode determination step, a motion information derivation step according to the determined prediction mode, and a prediction processing (prediction sample generation) step based on the derived motion information. The inter prediction process may be performed by the encoding apparatus and the decoding apparatus as described above. In this document, a coding device may include the encoding apparatus and/or the decoding apparatus.

Referring to FIG. 6, the coding apparatus determines an inter prediction mode for the current block (S600). Various inter prediction modes may be used for the prediction of the current block in the picture. For example, various modes, such as a merge mode, a skip mode, a motion vector prediction (MVP) mode, an affine mode, a subblock merge mode, a merge with MVD (MMVD) mode, and a historical motion vector prediction (HMVP) mode may be used. A decoder side motion vector refinement (DMVR) mode, an adaptive motion vector resolution (AMVR) mode, a bi-prediction with CU-level weight (BCW), a bi-directional optical flow (BDOF), and the like may be further used as additional modes. The affine mode may also be referred to as an affine motion prediction mode. The MVP mode may also be referred to as an advanced motion vector prediction (AMVP) mode. In the present document, some modes and/or motion information candidates derived by some modes may also be included in one of motion information-related candidates in other modes. For example, the HMVP candidate may be added to the merge candidate of the merge/skip modes, or also be added to an mvp candidate of the MVP mode. If the HMVP candidate is used as the motion information candidate of the merge mode or the skip mode, the HMVP candidate may be referred to as the HMVP merge candidate.

The prediction mode information indicating the inter prediction mode of the current block may be signaled from the encoding apparatus to the decoding apparatus. In this case, the prediction mode information may be included in the bit stream and received by the decoding apparatus. The prediction mode information may include index information indicating one of multiple candidate modes. Alternatively, the inter prediction mode may be indicated through a hierarchical signaling of flag information. In this case, the prediction mode information may include one or more flags. For example, whether to apply the skip mode may be indicated by signaling a skip flag, whether to apply the merge mode may be indicated by signaling a merge flag when the skip mode is not applied, and it is indicated that the MVP mode is applied or a flag for additional distinguishing may be further signaled when the merge mode is not applied. The affine mode may be signaled as an independent mode or signaled as a dependent mode on the merge mode or the MVP mode. For example, the affine mode may include an affine merge mode and an affine MVP mode.

The coding apparatus derives motion information for the current block (S610). Motion information derivation may be derived based on the inter prediction mode.

The coding apparatus may perform inter prediction using motion information of the current block. The encoding apparatus may derive optimal motion information for the current block through a motion estimation procedure. For example, the encoding apparatus may search a similar reference block having a high correlation in units of a fractional pixel within a predetermined search range in the reference picture by using an original block in an original picture for the current block and derive the motion information through the searched reference block. The similarity of the block may be derived based on a difference of phase based sample values. For example, the similarity of the block may be calculated based on a sum of absolute differences (SAD) between the current block (or a template of the current block) and the reference block (or the template of the reference block). In this case, the motion information may be derived based on a reference block having a smallest SAD in a search area. The derived motion information may be signaled to the decoding apparatus according to various methods based on the inter prediction mode.

The coding apparatus performs inter prediction based on motion information for the current block (S620). The coding apparatus may derive prediction sample(s) for the current block based on the motion information. A current block including prediction samples may be referred to as a predicted block.

Figure 7:
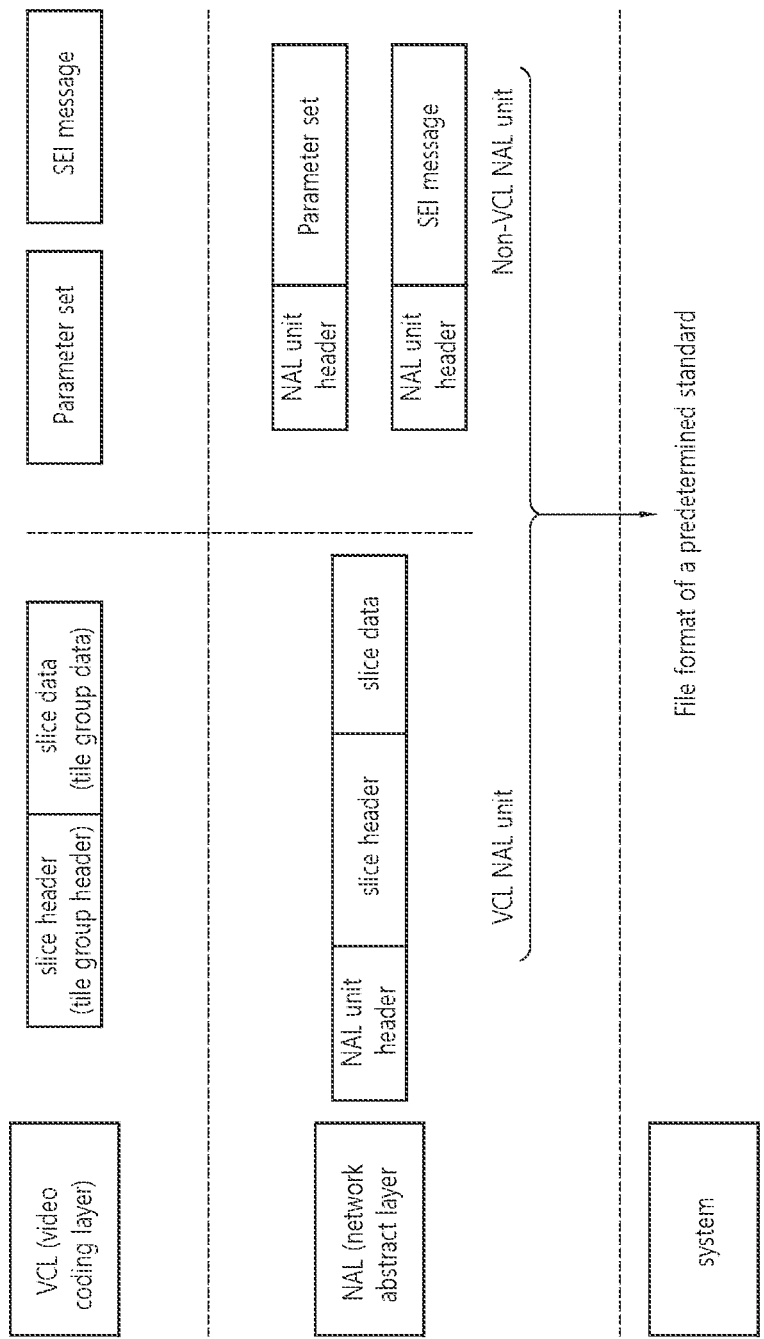
FIG. 7 schematically shows a hierarchical structure of coded image information.

FIG. 7 schematically shows a hierarchical structure of coded image information.

FIG. 7 may schematically show a video/image coded according to a coding layer and structure of the present disclosure. Referring to FIG. 7, the coded video/image may be divided into a video coding layer (VCL) that processes the video/image and a video/image decoding process, a subsystem that transmits and stores coded information, and a network abstraction layer (NAL) that is present between the VCL and the subsystem and is in charge of functions.

For example, in the VCL, VCL data including compressed image data (slice data) may be generated, or a picture parameter set (PPS), a sequence parameter set (SPS), a video parameter set (VPS) or a parameter set including a supplemental enhancement information (SEI) message additionally required for an image decoding process may be generated.

For example, in the NAL, a NAL unit may be generated by adding header information (NAL unit header) to a raw byte sequence payload (RBSP) generated in the VCL. In this case, the RBSP may refer to the slice data, the parameter set, the SEI message, and the like generated in the VCL. The NAL unit header may include NAL unit type information specified according to RBSP data included in the corresponding NAL unit.

For example, as shown in FIG. 7, a NAL unit may be classified into a VCL NAL unit and a non-VCL NAL unit according to the RBSP generated in the VCL. The VCL NAL unit may refer to a NAL unit including information (slice data) on an image and the non-VCL NAL unit may refer to a NAL unit including information (a parameter set or an SEI message) required for image decoding.

Header information may be attached to the above-described VCL NAL unit and non-VCL NAL unit according to a data standard of the subsystem and the VCL NAL unit and the non-VCL NAL unit including the header information may be transmitted through a network. For example, a NAL unit may be converted into a data format of a predetermined standard such as H.266/VVC file format, real-time transport protocol (RTP), transport stream (TS), or the like and transmitted over various networks.

In addition, as described above, the type of a NAL unit may be specified according to an RBSP data structure included in the NAL unit, and information on the NAL unit type may be stored and signaled in a NAL unit header.

For example, a NAL unit may be classified into a VCL NAL unit type and a non-VCL NAL unit type according to whether it includes information (slice data) on an image. In addition, the VCL NAL unit type may be classified according to characteristics and types of pictures included in the VCL NAL unit, and the non-VCL NAL unit type may be classified according to the type of a parameter set.

The following may be an example of NAL unit types specified according to the type of a parameter set included in the non-VCL NAL unit type.

Adaptation parameter set (APS) NAL unit: Type for a NAL unit including an APS

Decoding parameter set (DPS) NAL unit: Type for a NAL unit including a DPS

Video parameter set (VPS) NAL unit: Type for a NAL unit including a VPS

Sequence parameter set (SPS) NAL unit: Type for a NAL unit including an SPS

Picture parameter set (PPS) NAL unit: Type for a NAL unit including a PPS

Picture header (PH) NAL unit: Type for a NAL unit including a PH

The above-described NAL unit types may have syntax information on the NAL unit types, and the syntax information may be stored and signaled in a NAL unit header. For example, the syntax information may be nal_unit_type, and the NAL unit type may be specified as a nal_unit_type value.

Meanwhile, as described above, one picture may include a plurality of slices, and a slice may include a slice header and slice data. In this case, one picture header may be added (embedded) for a plurality of slices (a set of slice headers and slice data). The picture header (picture header syntax) may include information/parameters that can be commonly applied to pictures. The slice header (slice header syntax) may include information/parameters that can be commonly applied to slices. The APS (APS syntax) or the PPS (PPS syntax) may include information/parameters that can be commonly applied to one or more slices or pictures. The SPS (SPS syntax) may include information/parameters that can be commonly applied to one or more sequences. The VPS (VPS syntax) may include information/parameters that can be commonly applied to a plurality of layers. The DPS (DPS syntax) may include information/parameters that can be commonly applied to the entire image. The DPS may include information/parameters related to concatenation of a coded video sequence (CVS). In the present disclosure, a high level syntax (HLS) may include at least one of the APS syntax, the PPS syntax, the SPS syntax, the VPS syntax, the DPS syntax, the picture header syntax, and the slice header syntax.

Meanwhile, as described above, one NAL unit type may be set for one picture, in general, and the NAL unit type may be signaled through nal_unit_type in the NAL unit header of the NAL unit including slices, as described above. The following table shows an example of NAL unit type code and NAL unit type class.

TABLE 1

| nal_unit_type | Name of nal_unit_type | Content of NAL unit and RBSP syntax structure | NAL unit type class |
|---|---|---|---|
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RADL_NUT | Coded slice of a RADL picture slice_layer_rbsp( ) | VCL |
| 3 | RASL_NUT | Coded slice of a RASL picture slice_layer_rbsp( ) | VCL |
| 4 . . . 6 | RSV_VCL_4 . . . RSV_VCL_6 | Reserved non-IRAP VCL NAL unit types | VCL |
| 7 | IDR_W_RADL | Coded slice of an IDR picture | VCL |

TABLE 1-continued

| nal_unit_type | Name of nal_unit_type | Content of NAL unit and RBSP syntax structure | NAL unit type class |
|---|---|---|---|
| 8 | IDR_N_LP | slice_layer_rbsp( ) | |
| 9 | CRA_NUT | Coded slice of a CRA picture silce_layer_rbsp( ) | VCL |
| 10 | GDR_NUT | Coded slice of a GDR picture slice_layer_rbsp( ) | VCL |
| 11 | RSV_IRAP_11 | Reserved IRAP VCL NAL unit types | VCL |
| 12 | RSV_IRAP_12 | | |
| 13 | DPS_NUT | Decoding parameter set decoding_parameter_set_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 | PREFIX_APS_NUT | Adaptation parameter set adaptation_parameter_set_rbsp( ) | non-VCL |
| 18 | SUFFIX_APS_NUT | | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 | PREFIX_SEI_NUT | Supplemental enhancement information sei_rbsp( ) | non-VCL |
| 24 | SUFFIX_SEI_NUT | | |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28 ... 31 | UNSPEC_28 ... UNSPEC_31 | Unspecified non-VCL NAL unit types | non-VCL |

Meanwhile, as described above, a picture may be composed of one or more slices. In addition, parameters describing the picture may be signaled through a picture header (PH), and parameters describing a slice may be signaled through a slice header (SH). The PH may be delivered in its own NAL unit type. Further, the SH may be present at the beginning of a NAL unit including a payload of a slice (i.e., slice data).

For example, syntax elements of a signaled PH may be as follows.

TABLE 2

| | Descriptor |
|---|---|
| picture_header_rbsp( ) { | |
|   non_reference_picture_flag | u(1) |
|   gdr_pic_flag | u(1) |
|   no_output_of_prior_pics_flag | u(1) |
|   if( gdr_pic_flag ) | |
|     recovery_poc_cnt | ue(v) |
|   ph_pic_parameter_set_id | ue(v) |
|   if( sps_poc_msb_flag ) { | |
|     ph_poc_msb_present_flag | u(1) |
|     if( ph_poc_msb_present_flag ) | |
|       poc_msb_val | u(v) |
|   } | |
|   if( sps_subpic_id_present_flag && !sps_subpic_id_signalling_flag ) { | |
|     ph_subpic_id_signalling_present_flag | u(1) |
|     if( ph_subpics_id_signalling_present_flag ) { | |
|       ph_subpic_id_len_minus1 | ue(v) |
|       for( 1 = 0; 1 <= sps_num_subpics_minus1; i++ ) | |
|         ph_subpic_id[ i ] | u(v) |
|     } | |
|   } | |
|   if( !sps_loop_filter_across_virtual_boundaries_disabled_present_flag ) { | |
|     ph_loop_filter_across_virtual_boundaries_disabled_present_flag | u(1) |
|     if( ph_loop_filter_across_virtual_boundaries_disabled_present_flag ) { | |
|       ph_num_ver_virtual_boundaries | u(2) |
|       for( i = 0; i < ph_num_ver_virtual_boundaries; i++ ) | |
|         ph_virtual_boundaries_pos_x[ i ] | u(13) |
|       ph_num_hor_virtual_boundaries | u(2) |
|       for( i = 0; i < ph_num_hor_virtual_boundaries; i++ ) | |
|         ph_virtual_boundaries_pos_y[ i ] | u(13) |
|     } | |

TABLE 2-continued

|  | Descriptor |
|---|---|
| } | |
| if( separate_colour_plane_flag == 1 ) | |
|   colour_plane_id | u(2) |
| if( output_flag_present_flag ) | |
|   pic_output_flag | u(1) |
| pic_rpl_present_flag | u(1) |
| if( pic_rpl_present_flag ) { | |
|   for( i = 0; i < 2; i++ ) { | |
|     if(num_ref_pic_lists_in_sps[ i ] > 0 && !pps_ref_pic_list_sps_idc[ i ] && | |
|       ( i == 0 || ( i == 1 && rpl1_idx_present_flag ) ) ) | |
|       pic_rpl_sps_flag[ i ] | u(1) |
|     if( pic_rpl_sps_flag[ i ] ) { | |
|       if( num_ref_pic_lists_in_sps[ i ] > 1 && | |
|         ( i == 0 || ( i == 1 && rpl1_idx_present_flag ) ) ) | |
|         pic_rpl_idx[ i ] | u(v) |
|     } else | |
|       ref_pic_list_struct( i, num_ref_pic_lists_in_sps[ i ] ) | |
|     for( j = 0; j < NumLtrpEntries[ i ][ RplsIdx[ i ] ]; j++ ) { | |
|       if( ltrp_in_slice_header_flag[ i ][ RplsIdx[ i ] ] ) | |
|         pic_poc_lsb_lt[ i ][ j ] | u(v) |
|       pic_delta_poc_msb_present_flag[ i ][ j ] | u(1) |
|       if( pic_delta_poc_msb_present_flag[ i ][ j ] ) | |
|         pic_delta_poc_msb_cycle_lt[ i ][ j ] | ue(v) |
|     } | |
|   } | |
| } | |
| if( partition_constraints_override_enabled_flag ) { | |
|   partition_constraints_override_flag | ue(v) |
|   if( partition_constraints_override_flag ) { | |
|     pic_log2_diff_min_qt_min_cb_intra_slice_luma | ue(v) |
|     pic_log2_diff_min_qt_min_cb_inter_slice | ue(v) |
|     pic max_mtt_hierarchy_depth_inter_slice | ue(v) |
|     pic_max_mtt_hierarchy_depth_intra_slice_luma | ue(v) |
|     if( pic_max_mtt_hierarchy_depth_intra_slice_luma != 0 ) { | |
|       pic_log2_diff_max_bt_min_qt_intra_slice_luma | ue(v) |
|       pic_log2_diff_max_tt_min_qt_intra_slice_luma | ue(v) |
|     } | |
|     if( pic_max_mtt_hierarchy_depth_inter_slice != 0 ) { | |
|       pic_log2_diff_max_bt_min_qt_inter_slice | ue(v) |
|       pic_log2_diff_max_tt_min_qt_inter_slice | ue(v) |
|     } | |
|     if( qtbtt_dual_tree_intra_flag ) { | |
|       pic_log2_diff_min_qt_min_cb_intra_slice_chroma | ue(v) |
|       pic_max_mtt_hierarchy_depth_intra_slice_chroma | ue(v) |
|       if( pic_max_mtt_hierarchy_depth_intra_slice_chroma != 0 ) { | |
|         pic_log2_diff_max_bt_min_qt_intra_slice_chroma | ue(v) |
|         pic_log2_diff_max_tt_min_qt_intra_slice_chroma | ue(v) |
|       } | |
|     } | |
|   } | |
| } | |
| if( cu_qp_delta_enabled_flag ) { | |
|   pic_cu_qp_delta_subdiv_intra_slice | ue(v) |
|   pic_cu_qp_delta_subdiv_inter_slice | ue(v) |
| } | |
| if( pps_cu_chroma_qp_offset_list_enabled_flag ) { | |
|   pic_cu_chroma_qp_offset_subdiv_intra_slice | ue(v) |
|   pic_cu_chroma_qp_offset_subdiv_inter_slice | ue(v) |
| } | |
| if( sps_temporal_mvp_enabled_flag ) | |
|   pic_temporal_mvp_enabled_flag | u(1) |
| if(!pps_mvd_l1_zero_idc) | |
|   mvd_l1_zero_flag | u(1) |
| if( !pps_six_minus_max_num_merge_cand_plus1 ) | |
|   pic_six_minus_max_num_merge_cand | ue(v) |
| if( sps_affine_enabled_flag ) | |
|   pic_five_minus_max_num_subblock_merge_cand | ue(v) |
| if( sps_fpel_mmvd_enabled_flag ) | |
|   pic_fpel_mmvd_enabled_flag | u(1) |
| if( sps_bdof_pic_present_flag ) | |
|   pic_disable_bdof_flag | u(1) |
| if( sps_dmvr_pic_present_flag ) | |
|   pic_disable_dmvr_flag | u(1) |
| if( sps_prof_pic_present_flag ) | |
|   pic_disable_prof_flag | u(1) |
| if( sps_triangle_enabled_flag && MaxNumMergeCand >= 2 && | |
|   !pps_max_num_merge_cand_minus_max_num_triangle_cand_plus1 ) | |

TABLE 2-continued

| | Descriptor |
|---|---|
|     pic_max_num_merge_cand_minus_max_num_triangle_cand | ue(v) |
| if ( sps_ibc_enabled_flag ) | |
|     pic_six_minus_max_num_ibc_merge_cand | ue(v) |
| if( sps_joint_cbcr_enabled_flag ) | |
|     pic_joint_cbcr_sign_flag | u(1) |
| if( sps_sao_enabled_flag ) { | |
|     pic_sao_enabled_present_flag | u(1) |
|     if( pic_sao_enabled_present_flag ) { | |
|         pic_sao_luma_enabled_flag | u(1) |
|         if(ChromaArrayType != 0 ) | |
|             pic_sao_chroma_enabled_flag | u(1) |
|     } | |
| } | |
| if( sps_alf_enabled_flag ) { | |
|     pic_alf_enabled_present_flag | u(1) |
|     if( pic_alf_enabled_present_flag ) { | |
|         pic_alf_enabled_flag | u(1) |
|         if( pic_alf_enabled_flag ) { | |
|             pic_num_alf_aps_ids_luma | u(3) |
|             for( i = 0; i < pic_num_alf_aps_ids_luma; i++ ) | |
|                 pic_alf_aps_id_luma[ i ] | u(3) |
|             if( ChromaArrayType != 0 ) | |
|                 pic_alf_chroma_idc | u(2) |
|             if( pic_alf_chroma_idc ) | |
|                 pic_alf_aps_id_chroma | u(3) |
|         } | |
|     } | |
| } | |
| if ( !pps_dep_quant_enabled_flag ) | |
|     pic_dep_quant_enabled_flag | u(1) |
| if( !pic_dep_quant_enabled_flag ) | |
|     sign_data_hiding_enabled_flag | u(1) |
| if( deblocking_filter_override_enabled_flag ) { | |
|     pic_deblocking_filter_override_present_flag | u(1) |
|     if( pic_deblocking_filter_override_present_flag ) { | |
|         pic_deblocking_filter_override_flag | u(1) |
|         if( pic_deblocking_filter_override_flag ) { | |
|             pic_deblocking_filter_disabled_flag | u(1) |
|             if( !pic_deblocking_filter_disabled_flag ) { | |
|                 pic_beta_offset_div2 | se(v) |
|                 pic_tc_offset_div2 | se(v) |
|             } | |
|         } | |
|     } | |
| } | |
| if( sps_lmcs_enabled_flag ) { | |
|     pic_lmcs_enabled_flag | u(1) |
|     if( pic_lmcs_enabled_flag ) { | |
|         pic_lines_aps_id | u(2) |
|         if( ChromaArrayType != 0 ) | |
|             pic_chroma_residual_scale_flag | u(1) |
|     } | |
| } | |
| if( sps_scaling_list_enabled_flag ) { | |
|     pic_scaling_list_present_flag | u(1) |
|     if( pic_scaling_list_present_flag ) | |
|         pic_scaling_list_aps_id | u(3) |
| } | |
| if( picture_header_extension_present_flag ) { | |
|     ph_extension_length | ue(v) |
|     for( i = 0; i < ph_extension_length; i++) | |
|         ph_extension_data_byte[ i ] | u(8) |
| } | |
| rbsp_trailing_bits( ) | |
| } | |

Meanwhile, adoption of a PH may mean that there must be at least two NAL units for every coded picture. For example, one of the two units may be a NAL unit for the PH, and the other may be a NAL unit for a coded slice including a slice header (SH) and slice data. This may be a problem for a bitstream having a low bit rate because an additional NAL unit per picture may considerably affect the bit rate. Therefore, it may be desirable for the PH to have a mode in which it does not consume new NAL units.

Accordingly, the present disclosure proposes embodiments for solving the above-described problems. The proposed embodiments may be applied individually or in combination.

As an example, a method of signaling a flag in a high level parameter set indicating presence or absence of a PH NAL unit in a coded layer video sequence (CLVS) is proposed. That is, the flag may indicate whether a picture header is present in a NAL unit (i.e., a PH NAL unit) or a slice header.

Here, for example, the CLVS may mean a sequence of picture units (PUs) having the same value of nuh_layer_id. The picture unit may be a set of NAL unit(s) for a coded picture. Further, for example, the high level parameter set may be a sequence parameter set (SPS), a picture parameter set (PPS), or a slice header. The flag may be called ph_nal_present_flag. Alternatively, the flag may be referred to as a PH NAL presence flag.

In addition, with respect to the PH NAL presence flag, the present disclosure proposes an embodiment in which the value of ph_nal_present_flag is constrained to be the same for all SPSs referred to by pictures of the same CVS. The constraint may mean that the value of ph_nal_present_flag must be the same for one coded video sequence in a multi-layer bitstream.

Further, as an example, when the value of ph_nal_present_flag is equal to 1, one PH NAL unit is present, and this PH NAL unit is associated with video coding layer (VCL) NAL units of a picture.

Further, as an example, when the value of ph_nal_present_flag is equal to 0 (i.e., when a PH NAL unit is not present for each picture), a method in which the following constraints are applied is proposed.

For example, the aforementioned constraints may be as follows.

First, all pictures of CLVS may include only one slice.

Second, a PH NAL unit may not be present. A PH syntax table may be present in a slice layer RBSP along with a slice header (SH) and slice data. That is, the PH syntax table may be present in the slice header.

Third, the PH syntax table and the SH syntax table may start at a byte-aligned position. To implement this, a byte alignment bit may be added between the PH and the SH.

Fourth, the value of picture_header_extension_present_flag in all PPSs referring to a SPS may be 0.

Fifth, all syntax elements that may be present in the PH or the SH may be present in the PH instead of the SH.

Further, as an example, a method of updating access unit detection may be proposed. That is, instead of checking the PH, every new VCL NAL unit may mean a new access unit (AU). That is, when the value of ph_nal_present_flag indicates that the PH NAL unit is not present, the VCL NAL unit including ph_nal_present_flag is not a VCL NAL unit for a previous AU (i.e., a picture for the previous AU) and may mean that a VCL NAL unit for a new AU (i.e., a picture for a new AU) is parsed. Accordingly, when the value of ph_nal_present_flag indicates that the PH NAL unit is not present, the VCL NAL unit including ph_nal_present_flag may be the first VCL NAL unit for the picture of the new AU (e.g., a current picture to be decoded). Here, AU may mean a set of picture units (PUs) belonging to different layers and including coded pictures related to the same time for output of a decoded picture buffer (DPB). In addition, the PU may mean a set of NAL units including one coded picture, which are associated and have a continuous decoding order. That is, the PU may mean a set of NAL units for one coded picture, which are associated and have a continuous decoding order. Meanwhile, when a bitstream is a single layer bitstream rather than a multilayer bitstream, the AU may be the same as the PU.

The embodiments proposed in the present disclosure may be implemented as described below.

For example, an SPS syntax in which ph_nal_present_flag proposed in the embodiment of the present disclosure is signaled may be as follows.

TABLE 3

| | Descriptor |
|---|---|
| seq_parameter_set_rbsp( ) { | |
| ... | |
| ph_nal_present_flag | u(1) |
| ... | |
| } | |

Referring to Table 3, the SPS may include ph_nal_present_flag.

For example, the semantic of the syntax element ph_nal_present_flag may be as shown in the following table.

TABLE 4

...
ph_nal_present_flag equal to 1 specifies that NAL unit with nal_unit_type equal to PH_NUT is present for each coded picture in the CLVSs referring to the SPS.
ph_nal_present_flag equal to 0 specifies that NAL unit with nal_unit_type equal to PH_NUH is not present for each coded picture in the CLVSs referring to the SPS.
When ph_nal_present_flag is equal to 1, the following applies:
NAL unit with nal_unit_type PH_NUT shall not be present in the CLVSs referring to the SPS.
Each picture in the CLVSs referring to the SPS shall contain exactly one slice.
PH is present in slice layer RBSP.
...

For example, referring to Table 4, the syntax element ph_nal_present_flag may indicate whether a NAL unit having the same nal_unit_type as PH NUT is present for each coded picture of CLVSs referring to the SPS. For example, ph_nal_present_flag equal to 1 may indicate that a NAL unit having the same nal_unit_type as PH NUT is present for each coded picture of CLVSs referring to the SPS. Further, for example, ph_nal_present_flag equal to 0 may indicate that a NAL unit having the same nal_unit_type as PH_NUH is not present for each coded picture of CLVSs referring to the SPS.

Further, for example, when the ph_nal_present_flag is 1, the following may be applied.

A NAL unit having nal_unit_type of PH NUT (i.e., a PH NAL unit) may not be present in CLVSs referring to the SPS.

Each picture of CLVSs referring to the SPS may include one slice.

PH may be present in a slice layer RBSP.

Meanwhile, although a method in which ph_nal_present_flag is signaled through the SPS is proposed in Table 3 and Table 4, the method shown in Table 3 and Table 4 is an embodiment proposed in the present disclosure, and an embodiment in which ph_nal_present_flag is signaled through a PPS or a slice header instead of the SPS may also be proposed.

Meanwhile, for example, according to an embodiment proposed in the present disclosure, the picture header syntax table and the picture header RBSP may be separately signaled as shown in the following table.

TABLE 5

| | Descriptor |
|---|---|
| picture_header_rbsp( ) { | |
|   picture_headcer( ) | |

TABLE 5-continued

| | Descriptor |
|---|---|
|   rbsp_trailing_bits( ) | |
| } | |

Further, the signaled picture header syntax table may be as follows.

TABLE 6

| | Descriptor |
|---|---|
| picture_header_rbsp( ) { | |
|   non_reference_picture_flag | u(1) |
|   gdr_pic_flag | u(1) |
|   no_output_of_prior_pics_flag | u(1) |
|   if( gdr_pic_flag ) | |
|     recovery_poc_cnt | ue(v) |
|   ph_pic_parameter_set_id | ue(v) |
|   if( sps_poc_msb_flag ) { | |
|     ph_poc_msb_present_flag | u(1) |
|     if( ph_poc_msb_present_flag ) | |
|       poc_msb_val | u(v) |
|   } | |
|   if( sps_subpic_id_present_flag && !sps_subpic_id_signalling_flag ) { | |
|     ph_subpic_id_signalling_present_flag | u(1) |
|     if( ph_subpics_id_signalling_present_flag ) { | |
|       ph_subpic_id_len_minus1 | ue(v) |
|       for( i = 0; i <= sps_num_subpics_minus1; i++ ) | |
|         ph_subpic_id[ i ] | u(v) |
|     } | |
|   } | |
|   if( !sps_virtual_boundaries_present_flag ) { | |
|     ph_virtual_boundaries_present_flag | u(1) |
|     if( ph_virtual_boundaries_present_flag ) { | |
|       ph_num_ver_virtual_boundaries | u(2) |
|       for( i = 0; i < ph_num_ver_virtual_boundaries; i++ ) | |
|         ph_virtual_boundaries_pos_x[ i ] | u(13) |
|       ph_num_hor_virtual_boundaries | u(2) |
|       for( i = 0; i < ph_num_hor_virtual_boundaries; i++ ) | |
|         ph_virtual_boundaries_pos_y[ i ] | u(13) |
|     } | |
|   } | |
|   if( separate_colour_plane_flag == 1 ) | |
|     colour_plane_id | u(2) |
|   if( output_flag_present_flag ) | |
|     pic_output_flag | u(1) |
|   pic_rpl_present_flag | u(1) |
|   if( pic_rpl_present_flag ) { | |
|     for( i = 0; i < 2; i++ ) { | |
|       if(num_ref_pic_lists_in_sps[ i ] > 0 && !pps_ref_pic_list_sps_idc[ i ] && | |
|         ( i == 0 || (i == 1 && rpl1_idx_present_flag ) ) ) | |
|         pic_rpl_sps_flag[ i ] | u(1) |
|       if(pic_rpl_sps_flag[ i ] ) { | |
|         if( num_ref_pic_lists_in_sps[ i ] > 1 && | |
|           ( i == 0 || ( i == 1 && rpl1_idx_present_flag ) ) ) | |
|           pic_rpl_idx[ i ] | u(v) |
|       } else | |
|         ref_pic_list_struct( i, num_ref_pic_lists_in_sps[ i ] ) | |
|       for( j = 0; j < NumLtrpEntries[ i ][ RplsIdx[ i ] ]; j++ ) { | |
|         if( ltrp_in_slice_header_flag[ i ][ RplsIdx[ i ] ] ) | |
|           pic_poc_lsb_lt[ i ][ j ] | u(v) |
|         pic_delta_poc_msb_present_flag[ i ][ j ] | u(1) |
|         if( pic_delta_poc_msb_present_flag[ i ][ j ] ) | |
|           pic_delta_poc_msb_cycle_lt[ i ][ j ] | ue(v) |
|       } | |
|     } | |
|   } | |
|   if( partition_constraints_override_enabled_flag ) { | |
|     partition_constraints_override_flag | ue(v) |
|     if( partition_constraints_override_flag ) { | |
|       pic_log2_diff_min_qt_min_cb_intra_slice_luma | ue(v) |
|       pic_log2_diff_min_qt_min_cb_inter_slice | ue(v) |
|       pic_max_mtt_hierarchy_depth_inter_slice | ue(v) |
|       pic_max_mtt_hierarchy_depth_intra_slice_luma | ue(v) |

TABLE 6-continued

| | Descriptor |
|---|---|
|       if( pic_max_mtt_hierarehy_depth_intra_slice_luma != 0 ) { | |
|         pic_log2_diff_max_bt_min_qt_intra_slice_luma | ue(v) |
|         pic_log2_diff_max_tt_min_qt_intra_slice_luma | ue(v) |
|       } | |
|       if( pic_max_mtt_hierarchy_depth_inter_slice != 0 ) { | |
|         pic_log2_diff_max_bt_min_qt_inter_slice | ue(v) |
|         pic_log2_diff_max_tt_min_qt_inter_slice | ue(v) |
|       } | |
|       if( qtbtt_dual_tree_intra_flag ) { | |
|         pic_log2_diff_min_qt_min_cb_intra_slice_chroma | ue(v) |
|         pic_max_mtt_hierarchy_depth_intra_slice_chroma | ue(v) |
|         if( pic_max_mtt_hierarchy_depth_intra_slice_chroma != 0 ) { | |
|           pic_log2_diff_max_bt_min_qt_intra_slice_chroma | ue(v) |
|           pic_log2_diff_max_tt_min_qt_intra_slice_chroma | ue(v) |
|         } | |
|       } | |
|     } | |
|   } | |
|   if( cu_qp_delta_enabled_flag ) { | |
|     pic_cu_qp_delta_subdiv_intra_slice | ue(v) |
|     pic_cu_qp_delta_subdiv_inter_slice | ue(v) |
|   } | |
|   if( pps_cu_chroma_qp_offset_list_enabled_flag ) { | |
|     pic_cu_chroma_qp_offset_subdiv_intra_slice | ue(v) |
|     pic_cu_chroma_qp_offset_subdiv_inter_slice | ue(v) |
|   } | |
|   if( sps_temporal_mvp_enabled_flag ) | |
|     pic_temporal_mvp_enabled_flag | u(1) |
|   if(!pps_mvd_l1_zero_idc ) | |
|     mvd_l1_zero_flag | u(1) |
|   if( !pps_six_minus_max_num_merge_cand_plus1 ) | |
|     pic_six_minus_max_num_merge_cand | ue(v) |
|   if( sps_affine_enabled_flag ) | |
|     pic_five_minus_max_num_subblock_merge_cand | ue(v) |
|   if( sps_fpel_mmvd_enabled_flag ) | |
|     pic_fpel_mmvd_enabled_flag | u(1) |
|   if( sps_bdof_pic_present_flag ) | |
|     pic_disable_bdof_flag | u(1) |
|   if( sps_dmvr_pic_present_flag ) | |
|     pic_disable_dmvr_flag | u(1) |
|   if( sps_prof_pic_present_flag ) | |
|     pic_disable_prof_flag | u(1) |
|   if( sps_triangle_enabled_flag && MaxNumMergeCand >= 2 && | |
|     !pps_max_num_merge_cand_minus_max_num_triangle_cand_plus1 ) | |
|     pic_max_num_merge_cand_minus_max_num_triangle_cand | ue(v) |
|   if ( sps_ibc_enabled_flag ) | |
|     pic_six_minus_max_num_ibc_merge_cand | ue(v) |
|   if( sps_joint_cbcr_enabled_flag ) | |
|     pic_joint_cbcr_sign_flag | u(1) |
|   if( sps_sao_enabled_flag ) { | |
|     pic_sao_enabled_present_flag | u(1) |
|     if( pic_sao_enabled_present_flag ) { | |
|       pic_sao_luma_enabled_flag | u(1) |
|       if(ChromaArrayType != 0 ) | |
|         pic_sao_chroma_enabled_flag | u(1) |
|     } | |
|   } | |
|   if( sps_alf_enabled_flag ) { | |
|     pic_alf_enabled_present_flag | u(1) |
|     if( pic_alf_enabled_present_flag ) { | |
|       pic_alf_enabled_flag | u(1) |
|       if( pic_alf_enabled_flag ) { | |
|         pic_num_alf_aps_ids_luma | u(3) |
|         for( i = 0; i < pic_num_alf_aps_ids_luma; i++ ) | |
|           pic_alf_aps_id_luma[ i ] | u(3) |
|         if( ChromaArrayType != 0 ) | |
|           pic_alf_chroma_idc | u(2) |
|         if( pic_alf_chroma_idc ) | |
|           pic_alf_aps_id_chroma | u(3) |
|       } | |
|     } | |
|   } | |
|   if ( pps_dep_quant_enabled_idc == 0 ) | |
|     pic_dep_quant_enabled_flag | u(1) |
|   if( !pic_dep_quant_enabled_flag ) | |
|     sign_data_hiding_enabled_flag | u(1) |
|   if( deblocking_filter_override_enabled_flag ) { | |
|     pic_deblocking_filter_override_present_flag | u(1) |

TABLE 6-continued

| | Descriptor |
|---|---|
| if( pic_deblocking_filter_override_present_flag ) { | |
|   pic_deblocking_filter_override_flag | u(1) |
|   if( pic_deblocking_filter_override_flag ) { | |
|     pic_deblocking_filter_disabled_flag | u(1) |
|     if( !pic_deblocking_filter_disabled_flag ) { | |
|       pic_beta_offset_div2 | se(v) |
|       pic_tc_offset_div2 | se(v) |
|     } | |
|   } | |
| } | |
| } | |
| if( sps_lmcs_enabled_flag ) { | |
|   pic_lmcs_enabled_flag | u(1) |
|   if( pic_lmcs_enabled_flag ) { | |
|     pic_lmcs_aps_id | u(2) |
|     if( ChromaArrayType != 0 ) | |
|       pic_chroma_residual_scale_flag | u(1) |
|   } | |
| } | |
| if( sps_scaling_list_enabled_flag ) { | |
|   pic_scaling_list_present_flag | u(1) |
|   if( pic_scaling_list_present_flag ) | |
|     pic_scaling_list_aps_id | u(3) |
| } | |
| if( picture_header_extension_present_flag ) { | |
|   ph_extension_length | ue(v) |
|   for( i = 0; i < ph_extension_length; i++) | |
|     ph_extension_data_byte[ i ] | u(8) |
| } | |
| rbsp_trailing_bits( ) | |
| } | |

Further, according to an embodiment proposed in the present disclosure, for example, the slice layer RBSP may be signaled as follows.

TABLE 7

| | Descriptor |
|---|---|
| slice_layer_rbsp( ) { | |
|   if( !ph_nal_present_flag ) { | |
|     picture_header( ) | |
|     byte_alignment( ) | |
|   } | |
|   slice_header( ) | |
|   slice_data( ) | |
|   rbsp_slice_trailing_bits( ) | |
| } | |

Further, for example, according to an embodiment proposed in the present disclosure, one or more of the constraints shown in the following table may be applied.

TABLE 8

The following one or more constraints may be applied:

When ph_nal_present_flag is equal to 0, the value of picture_header_extension_present_flag shall be equal to 0.

It is a requirement of bitstream conformance that the value of pic_rpl_present_flag shall be equal to 1 when both conditions below are true:

ph_nal_present_flag is equal to 0 and the picture associated with the PH is not an IDR picture.

ph_nal_present_flag is equal to 0, the picture associated with the PH is an IDR picture, and sps_id_rpl_present_flag is equal to 1.

* rpl: reference picture list

It is a requirement of bitstream conformance that the value of pic_sao_enabled_present_flag shall be equal to 1 when the value of ph_nal_present_flag is equal to 0.

It is a requirement of bitstream conformance that the value of pic_alf_enabled_present_flag shall be equal to 1 when the value of ph_nal_present_flag is equal to 0.

It is a requirement of bitstream conformance that the value of pic_deblocking_filter_override_present_flag shall be equal to 1 when the value of ph_nal_present_flag is equal to 0.

For example, referring to Table 8, if ph_nal_present_flag is 0, the value of picture_header_extension_present_flag may be 0.

In addition, for example, when both the following conditions are true, it may be requirement for bitstream suitability that the value of pic_rpl_present_flag must be equal to 1.

ph_nal_present_flag is 0, and a picture associated with a PH is not an IDR picture.

ph_nal_present_flag is 0, a picture associated with a PH is an IDR picture, and sps_id_rpl_present_flag is equal to 1.

Here, rpl may mean a reference picture list.

In addition, for example, when the value of ph_nal_present_flag is 0, it may be requirement for bitstream suitability that the value of pic_sao_enabled_present_flag must be equal to 1.

Further, for example, when the value of ph_nal_present_flag is 0, it may be requirement for bitstream suitability that the value of pic_alf_enabled_present_flag must be equal to 1.

Further, for example, when the value of ph_nal_present_flag is 0, it may be requirement for bitstream suitability that the value of pic_deblocking_filter_override_present_flag must be equal to 1.

Meanwhile, for example, embodiment(s) may be applied according to the following procedure.

Figure 8:
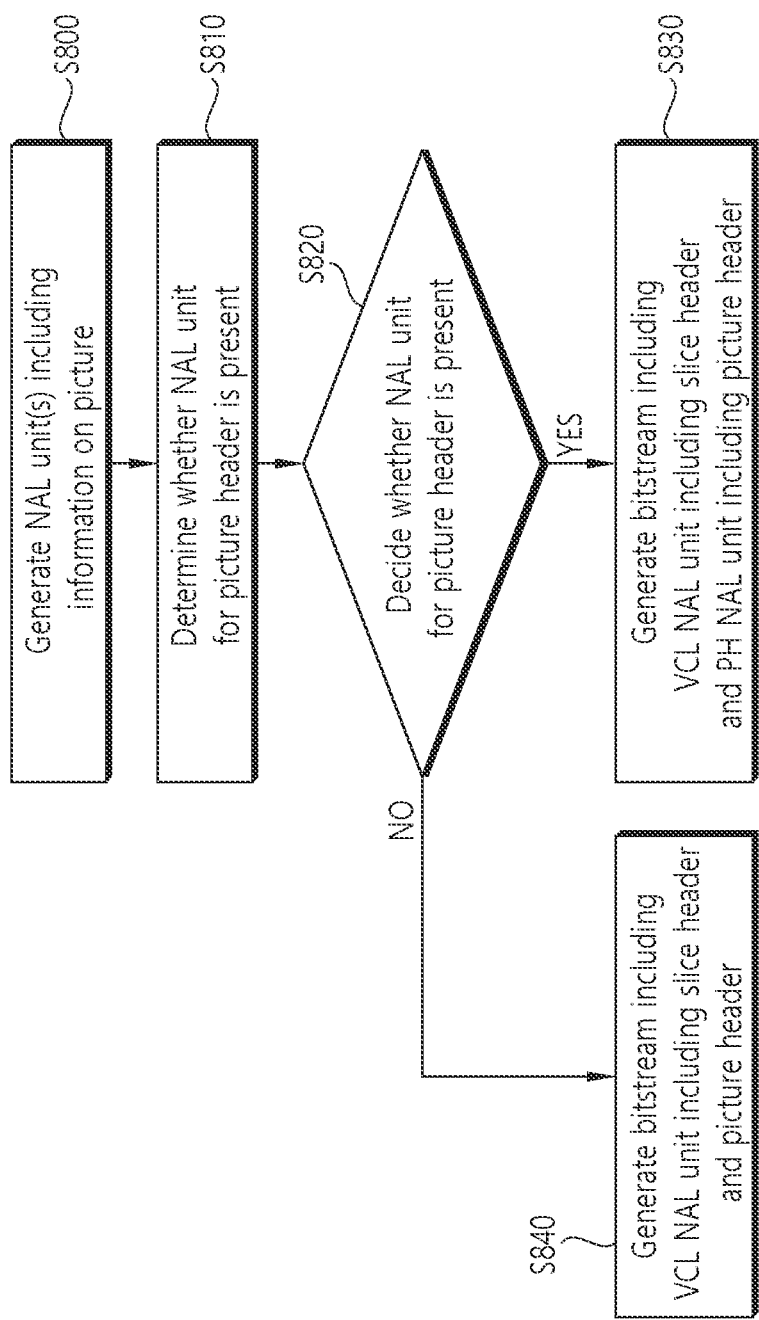
FIG. 8 schematically shows an encoding procedure according to an embodiment of the present disclosure.

FIG. 8 schematically shows an encoding procedure according to an embodiment of the present disclosure.

Referring to FIG. 8, an encoding apparatus may generate NAL unit(s) including information on a picture (S800). The encoding apparatus may determine whether a NAL unit for a picture header is present (S810) and may decide whether a NAL unit for the picture header is present (S820).

For example, when a NAL unit for the picture header is present, the encoding apparatus may generate a bitstream including a VCL NAL unit including a slice header and a PH NAL unit including the picture header (S830).

Meanwhile, for example, when a NAL unit for the picture header is not present, the encoding apparatus may generate a bitstream including a VCL NAL unit including a slice header and a picture header (S840). That is, the picture header syntax structure may be present in the slice header.

Figure 9:
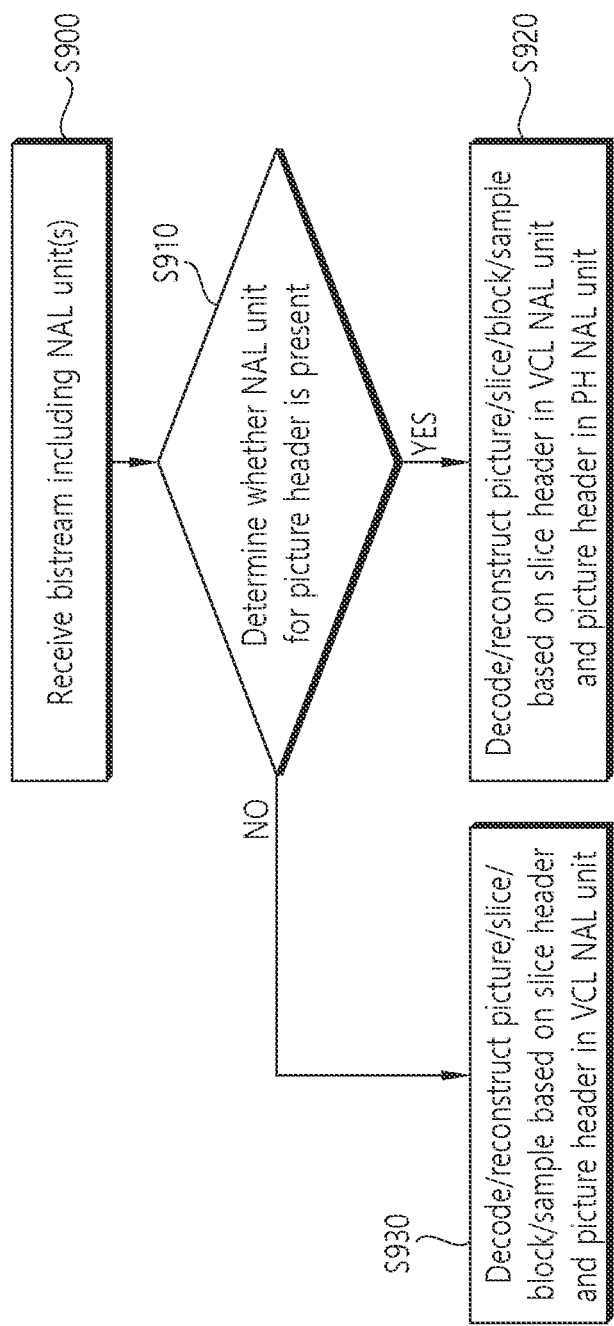
FIG. 9 schematically shows a decoding procedure according to an embodiment of the present disclosure.

FIG. 9 schematically shows a decoding procedure according to an embodiment of the present disclosure.

Referring to FIG. 9, a decoding apparatus may receive a bitstream including NAL unit(s) (S900). Thereafter, the decoding apparatus may determine whether a NAL unit for a picture header is present (S910).

For example, when a NAL unit for the picture header is present, the decoding apparatus may decode/reconstruct a picture/slice/block/sample based on a slice header in a VCL NAL unit and the picture header in a PH NAL unit (S920).

Meanwhile, for example, when a NAL unit for the picture header is not present, the decoding apparatus may decode/reconstruct a picture/slice/block/sample based on a slice header and a picture header in a VCL NAL unit (S930).

Here, the (coded) bitstream may include one or more NAL units for decoding a picture. In addition, the NAL unit may be a VCL NAL unit or a non-VCL NAL unit. For example, the VCL NAL unit may include information on a coded slice, and the VAL NAL unit may have a NAL unit type having the NAL unit type class "VCL" shown in Table 1 above.

Meanwhile, according to the embodiment proposed in the present disclosure, the bitstream may include a PH NAL unit (a NAL unit for a picture header) or the bitstream may not include a PH NAL unit for the current picture. Information indicating whether a PH NAL unit is present (e.g., ph_nal_present_flag) may be signaled through an HLS (e.g., a VPS, a DPS, an SPS, a slice header, or the like).

Figure 10:
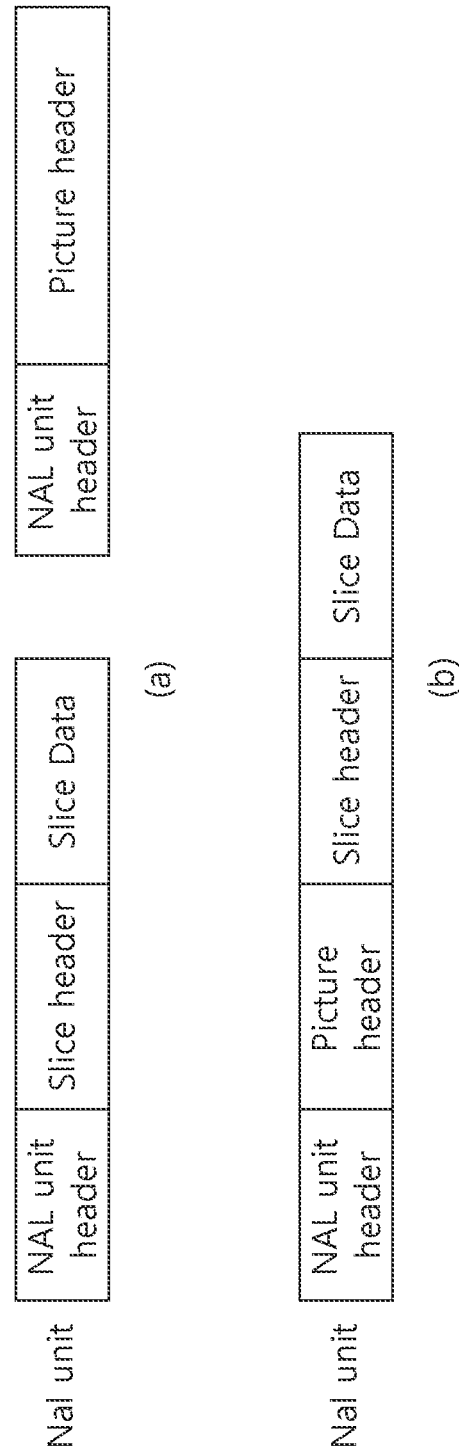
FIG. 10 schematically shows a picture header configuration in a NAL unit according to presence or absence of a PH NAL unit.

FIG. 10 schematically shows a picture header configuration in a NAL unit according to presence or absence of a PH NAL unit. For example, (a) of FIG. 10 shows a case in which a PH NAL unit for the current picture is present, and (b) of FIG. 10 shows a case in which a PH NAL unit for the current picture is not present but a picture header is included in a VCL NAL unit.

For example, when the PH NAL unit is present, the picture header may be included in the PH NAL unit. On the other hand, when the PH NAL unit is not present, the picture header may still be configured but may be included in another type of NAL unit. For example, the picture header may be included in a VCL NAL unit. The VCL NAL unit may include information on a coded slice. A VCL unit may include a slice header for a coded slice. For example, when a specific slice header includes information representing that a coded/associated slice is the first slice in a picture or a subpicture, the picture header may be included in a specific VAL NAL unit including the specific slice header. Or, for example, when the PH NAL unit is not present, the picture header may be included in a non-VCL NAL unit such as a PPS NAL unit, an APS NAL unit, or the like.

Figure 11:
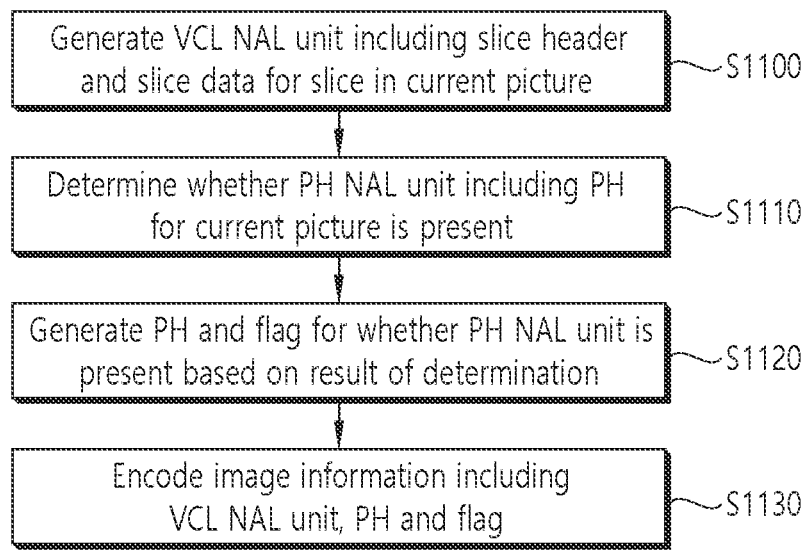
FIG. 11 schematically shows an image encoding method by an encoding apparatus according to the present document.

FIG. 11 schematically shows an image encoding method by an encoding apparatus according to the present document. The method disclosed in FIG. 11 may be performed by the encoding apparatus illustrated in FIG. 2. Specifically, for example, S1100 to S1130 of FIG. 11 may be performed by the entropy encoder of the encoding apparatus. Further, although not shown, the process of decoding the current picture may be performed by the predictor and the residual processor of the encoding apparatus.

The encoding apparatus generates a Video Coding Layer (VCL) Network Abstraction Layer (NAL) unit including a slice header and slice data for a slice in a current picture (S1100). The encoding apparatus may generate the slice header and the slice data for the slice in the current picture. The slice header and the slice data may be included in the VCL NAL unit.

For example, the slice header may include syntax elements representing parameters for the slice. Further, for example, the slice data may include prediction information and residual information for blocks in the slice.

Meanwhile, for example, the encoding apparatus may generate and encode the prediction information for the block in the slice of the current picture. In this case, various prediction methods disclosed in the present disclosure, such as inter-prediction or intra-prediction, may be applied. For example, the encoding apparatus may determine whether to perform inter-prediction or intra-prediction on the block and may determine a specific inter-prediction mode or a specific intra-prediction mode based on RD cost. According to the determined mode, the encoding apparatus may derive a prediction sample for the block. The prediction information may include prediction mode information for the block.

Further, for example, the encoding apparatus may encode the residual information for the block of the current picture.

For example, the encoding apparatus may derive a residual sample by subtracting the prediction sample from the original sample for the block.

Then, for example, the encoding apparatus may quantize the residual sample to derive a quantized residual sample, may derive a transform coefficient based on the quantized residual sample, and generate and encode the residual information based on the transform coefficient. Alternatively, for example, the encoding apparatus may quantize the residual sample to derive a quantized residual sample, transform the quantized residual sample to derive a transform coefficient, and generate and encode the residual information based on the transform coefficient.

Meanwhile, for example, the encoding apparatus may derive a prediction sample and a residual sample for the block in the slice of the current picture based on the prediction information and the residual information and generate a reconstructed sample/reconstructed picture for the current picture based on the prediction sample and the residual sample.

The encoding apparatus determines whether a Picture Header (PH) NAL unit including a PH for the current picture is present (S1110). For example, the encoding apparatus may determine whether the PH NAL unit is present. For example, when the PH NAL unit is present, the encoding apparatus may generate a PH NAL unit including a PH related to the current picture and/or a Video Coding Layer (VCL) NAL unit including information on slices of the current picture (e.g., slice header and slice data). Also, for example, when the PH NAL unit is not present, the encoding apparatus may generate a Video Coding Layer (VCL) NAL unit including a PH related to the current picture and information on one slice of the current picture (e.g., slice header and slice data). Further, for example, when the flag represents that the PH NAL unit is not present, the current picture may include only one slice. Here, for example, the PH may include syntax elements representing parameters for the current picture.

The encoding apparatus generates the PH and a flag for whether the PH NAL unit is present based on a result of the determination (S1120). For example, the encoding apparatus may generate the PH and a flag for whether the PH NAL unit is present based on the determination result. For example, the flag may represent whether the PH NAL unit is present. For example, when the value of the flag is 1, the flag may represent that the PH NAL unit is present, and when the value of the flag is 0, the flag may represent that the PH NAL unit is not present. Alternatively, for example, when the value of the flag is 0, the flag may represent that the PH NAL unit is present, and when the value of the flag is 1, the flag may represent that the PH NAL unit is not present. The syntax element of the flag may be the above-described ph_nal_present_flag.

Further, for example, when it is determined that the PH NAL unit is present, the PH for the current picture may be included in the PH NAL unit, and when it is determined that the PH NAL unit is not present, the PH for the current picture may be included in a Video Coding Layer (VCL) NAL unit including a slice header and slice data for the slice of the current picture.

The encoding apparatus encodes image information including the VCL NAL unit, the PH and the flag (S1130). The encoding apparatus may encode the image information including the VCL NAL unit, the PH and the flag. The image information may include the VCL NAL unit, the PH, and the flag. Further, for example, the image information may include a high-level syntax, and the flag may be included in the high-level syntax. That is, for example, the flag may be signaled in the high-level syntax. For example, the high-level syntax may be a sequence parameter set (SPS). Or, for example, the high-level syntax may be a slice header (SH). That is, for example, the flag may be included in the slice header.

Meanwhile, for example, the PH may be included in the PH NAL unit when the flag represents that the PH NAL unit is present, and the PH may be included in the slice header for the slice of the current picture when the flag represents that the PH NAL unit is not present. For example, the PH may be included in the PH NAL unit when the flag represents that the PH NAL unit is present, and the PH may be included in a VCL NAL unit including a slice header and slice data for the slice when the flag represents that the PH NAL unit is not present. That is, for example, the PH may be included in the PH NAL unit when the flag represents that the PH NAL unit is present, and the PH may be included in the slice header when the flag represents that the PH NAL unit is not present. For example, the image information may include the PH NAL unit including the PH and at least one VCL NAL unit including the slice header and slice data for the slice of the current picture when the flag represents that the PH NAL unit is present, and the image information may include a VCL NAL unit including the PH, the slice header, and the slice data when the flag represents that the PH NAL unit is not present. Further, for example, when the flag represents that the PH NAL unit is not present, the image information may not include the PH NAL unit.

Further, for example, when the flag represents that the PH NAL unit is not present, a PH NAL unit may not be present for all pictures in a coded video layer sequence (CLVS) including the current picture. That is, for example, flags representing for whether a PH NAL unit is present for all pictures in a coded video layer sequence (CLVS) may have the same value. Further, for example, when the flag represents that the PH NAL unit is not present, picture headers for all pictures in the CLVS may be included in VCL NAL units including slice headers of all the pictures.

Meanwhile, for example, AU detection may be modified from the existing method. For example, a new VCL NAL unit may mean a new AU. That is, for example, when the flag represents that the PH NAL unit is not present, the VCL NAL unit including the slice header may be the first VCL NAL unit of the current picture (for a new AU (i.e., AU for the current picture)). For example, the flag may be included in the slice header of the VCL NAL unit. Or, for example, when the flag represents that the PH NAL unit is present, it may be the first VCL NAL unit of the current picture which follows the PH NAL unit, that is, is signaled after the PH NAL unit.

Meanwhile, the encoding apparatus may decode the current picture. For example, the encoding apparatus may decode the current picture based on the syntax elements of the PH, the syntax elements of the slice header, and the slice data. For example, the syntax elements of the PH may be the syntax elements shown in Table 6. The PH may include syntax elements representing parameters for the current picture, the slice header may include syntax elements representing parameters for a slice of the current picture, and the slice data may include prediction information and residual information for a block in the slice.

Meanwhile, a bitstream including the image information may be transmitted to a decoding apparatus through a network or a (digital) storage medium. Here, the network may include a broadcasting network and/or a communication network, and the digital storage medium may include various storage media such as a USB, an SD, a CD, a DVD, Blu-ray, an HDD, and an SSD.

Figure 12:
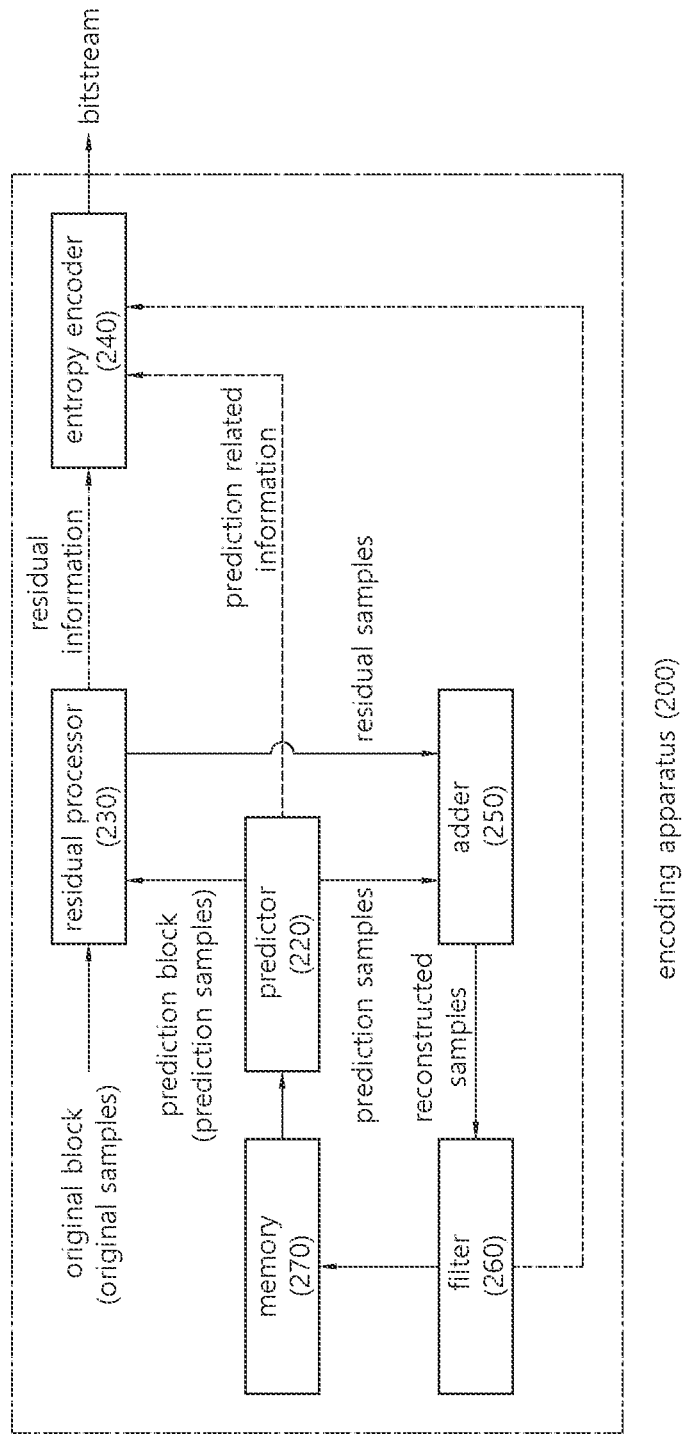
FIG. 12 schematically shows an encoding apparatus for performing an image encoding method according to this document.

FIG. 12 schematically shows an encoding apparatus for performing an image encoding method according to this document. The method illustrated in FIG. 11 may be performed by the encoding apparatus illustrated in FIG. 12. Specifically, for example, the entropy encoder of the encoding apparatus of FIG. 12 may perform S1100 to S1130.

Although not shown, the process of decoding the current picture may be performed by the predictor and the residual processor of the encoding apparatus.

Figure 13:
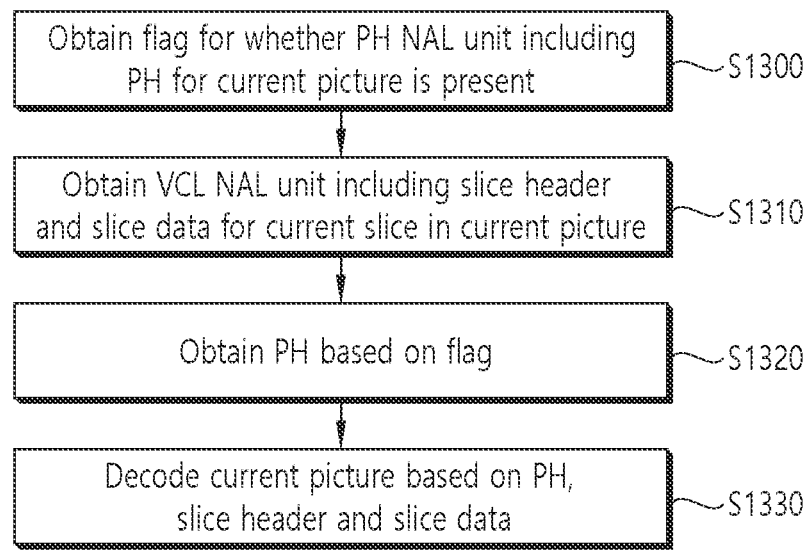
FIG. 13 schematically shows an image decoding method by a decoding apparatus according to this document.

FIG. 13 schematically shows an image decoding method by a decoding apparatus according to this document. The method illustrated in FIG. 13 may be performed by the decoding apparatus illustrated in FIG. 3. Specifically, for example, S1300 to S1310 of FIG. 13 may be performed by the entropy decoder of the decoding apparatus, and S1320 of FIG. 13 may be performed by the predictor and the residual processor of the decoding apparatus.

The decoding apparatus obtains a flag for whether a Picture Header (PH) Network Abstraction Layer (NAL) unit including a PH for a current picture is present (S1300). The decoding apparatus may obtain image information through a bitstream. For example, the decoding apparatus may obtain the flag for whether a Picture Header (PH) Network Abstraction Layer (NAL) unit including a PH for a current picture is present through the bitstream. For example, the decoding apparatus may obtain the image information through the bitstream, and the image information may include the flag. Also, for example, the image information may include a high-level syntax, and the flag may be included in the high-level syntax. That is, for example, the flag may be obtained through the high-level syntax. For example, the high-level syntax may be a sequence parameter set (SPS). Or, for example, the high-level syntax may be a slice header (SH). That is, for example, the flag may be included in the slice header.

For example, the flag may represent whether the PH NAL unit is present. For example, when the value of the flag is 1, the flag may represent that the PH NAL unit is present, and when the value of the flag is 0, the flag may represent that the PH NAL unit is not present. Alternatively, for example, when the value of the flag is 0, the flag may represent that the PH NAL unit is present, and when the value of the flag is 1, the flag may represent that the PH NAL unit is not present. The syntax element of the flag may be the above-described ph_nal_present_flag.

The decoding apparatus obtains a Video Coding Layer (VCL) NAL unit including a slice header and slice data for a current slice in the current picture (S1310). The decoding apparatus may obtain image information including information for the current picture through the bitstream. For example, the decoding apparatus may obtain image information including the VCL NAL unit including the slice header and slice data for the current slice in the current picture through the bitstream. For example, the slice header and the slice data may include syntax elements representing parameters for the current slice.

Also, for example, the slice data may include prediction information and residual information for a block in the current slice. For example, the prediction information may include prediction mode information for the block. Also, for example, the residual information is information for residual samples of the block. The residual information may include information for quantized transform coefficients for the residual samples.

The decoding apparatus obtains the PH based on the flag (S1320). The decoding apparatus may obtain the PH from the PH NAL unit or the VCL NAL unit including the slice header and the slice data based on the flag. That is, for example, the decoding apparatus may obtain the PH from the PH NAL unit or the slice header based on the flag.

For example, the PH may be obtained from the PH NAL unit when the flag represents that the PH NAL unit is present, and the PH may be obtained from the VCL NAL unit including the slice header and the slice data when the flag represents that the PH NAL unit is not present. That is, for example, the PH may be obtained from the PH NAL unit when the flag represents that the PH NAL unit is present, and the PH may be obtained from the slice header when the flag represents that the PH NAL unit is not present. For example, the PH may be included in the PH NAL unit when the flag represents that the PH NAL unit is present, and the PH may be included in the VCL NAL unit including the slice header and the slice data when the flag represents that the PH NAL unit is not present. That is, for example, the PH may be included in the PH NAL unit when the flag represents that the PH NAL unit is present, and the PH may be included in the slice header when the flag represents that the PH NAL unit is not present. For example, the image information may include the PH NAL unit including the PH and the VCL NAL unit including the slice header when the flag represents that the PH NAL unit is present, and the image information may include a VCL NAL unit including the PH, the slice header, and the slice data when the flag represents that the PH NAL unit is not present. Further, for example, when the flag represents that the PH NAL unit is not present, the image information may not include a PH NAL unit.

Further, for example, when the flag represents that the PH NAL unit is not present, the current picture for the PH may include only one slice. That is, for example, when the flag represents that the PH NAL unit is not present, the image information may include a VCL NAL unit including a slice header and slice data for one slice (current slice) in the current picture.

Further, for example, when the flag represents that the PH NAL unit is present, the PH NAL unit for the current picture and at least one VCL NAL unit including the slice header and slice data for the current picture may be obtained through the bitstream. That is, for example, when the flag represents that the PH NAL unit is present, the image information may include a VCL NAL unit including a slice header and slice data for a slice other than the current slice in the current picture along with the PH NAL unit for the current picture and the VCL NAL unit for the current slice.

Further, for example, when the flag represents that the PH NAL unit is not present, a PH NAL unit may not be present for all pictures in a coded video layer sequence (CLVS) including the current picture. That is, for example, flags representing whether a PH NAL unit is present for all pictures in the coded video layer sequence (CLVS) may have the same value. Further, for example, when the flag represents that the PH NAL unit is not present, picture headers for all the pictures in the CLVS may be included in slice headers of all the pictures. That is, for example, when the flag represents that the PH NAL unit is not present, the picture headers for all the pictures in the CLVS may be included in VCL NAL units including slice headers of all the pictures.

Meanwhile, for example, AU detection may be modified from the existing method. For example, a new VCL NAL unit may mean a new AU. That is, for example, when the flag represents that the PH NAL unit is not present, the VCL NAL unit including the slice header may be the first VCL NAL unit of the current picture (for a new AU (i.e., AU for the current picture)). For example, the flag may be included in the slice header of the VCL NAL unit. Or, for example, when the flag represents that the PH NAL unit is present, it may be the first VCL NAL unit of the current picture which follows the PH NAL unit, that is, is signaled after the PH NAL unit.

The decoding apparatus decodes the current picture based on the PH, the slice header and the slice data (S1330). The decoding apparatus may decode the current picture based on the PH, the slice header, and the slice data. For example, the decoding apparatus may decode the current picture based on the syntax elements of the PH, the syntax elements of the slice header, and the slice data. For example, the syntax elements of the PH may be the syntax elements shown in Table 6. The PH may include syntax elements representing parameters for the current picture, and the slice header may include syntax elements representing parameters for the current slice. Also, for example, the slice data may include prediction information and residual information for a block in the current slice. For example, the decoding apparatus may derive a prediction sample and a residual sample for the block in the current slice of the current picture based on the prediction information and the residual information and generate a reconstructed sample/reconstructed picture for the current picture based on the prediction sample and the residual sample.

As described above, an in-loop filtering procedure such as deblocking filtering, SAO and/or ALF procedure may be applied to the reconstructed samples in order to improve subjective/objective picture quality as necessary.

Figure 14:
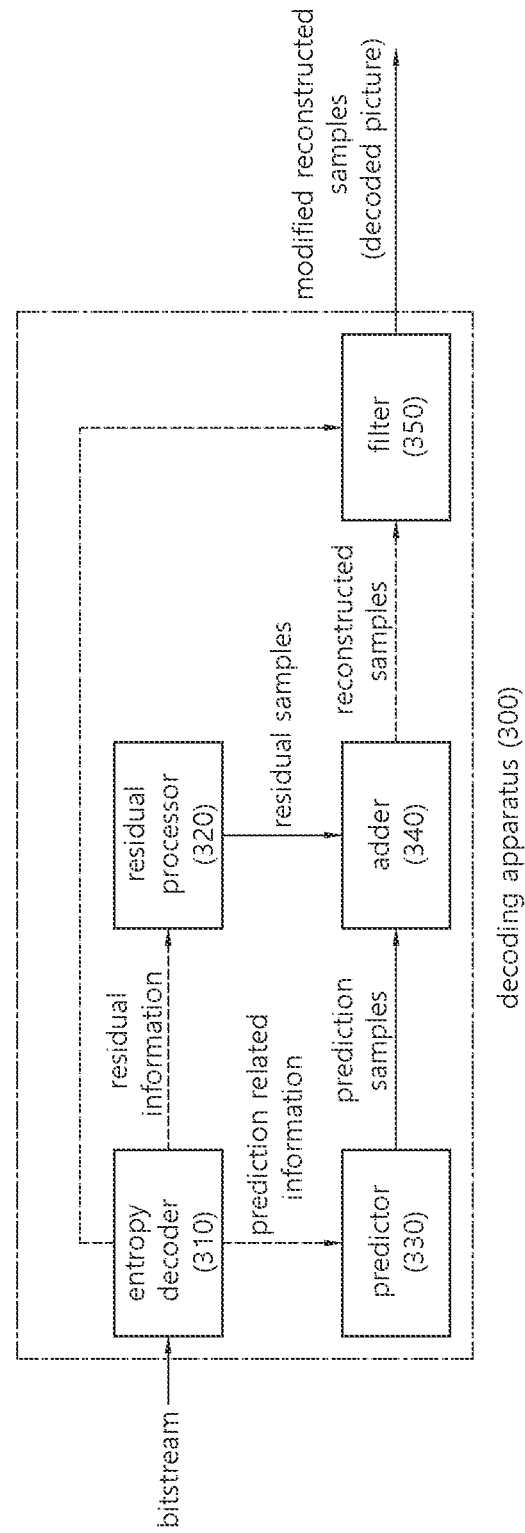
FIG. 14 schematically shows a decoding apparatus for performing an image decoding method according to this document.

FIG. 14 schematically shows a decoding apparatus for performing an image decoding method according to this document. The method illustrated in FIG. 13 may be performed by the decoding apparatus illustrated in FIG. 14. Specifically, for example, the entropy decoder of the decoding apparatus of FIG. 14 may perform S1300 to S1320 of FIG. 13, and the predictor and the residual processor of the decoding apparatus of FIG. 14 may perform S1330 of FIG. 13.

According to the present disclosure described above, it is possible to signal the flag representing presence or absence of a PH NAL unit, to adjust a NAL unit adaptively to the bit rate of a bitstream based on the flag, and to improve overall coding efficiency.

In addition, according to the present disclosure, it is possible to set a constraint on the number of slices in the current picture and a constraint on presence or absence of a PH NAL unit for related pictures based on the flag representing presence or absence of a PH NAL unit and to control a NAL unit adaptively to the bit rate, thereby improving the overall coding efficiency.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 15:
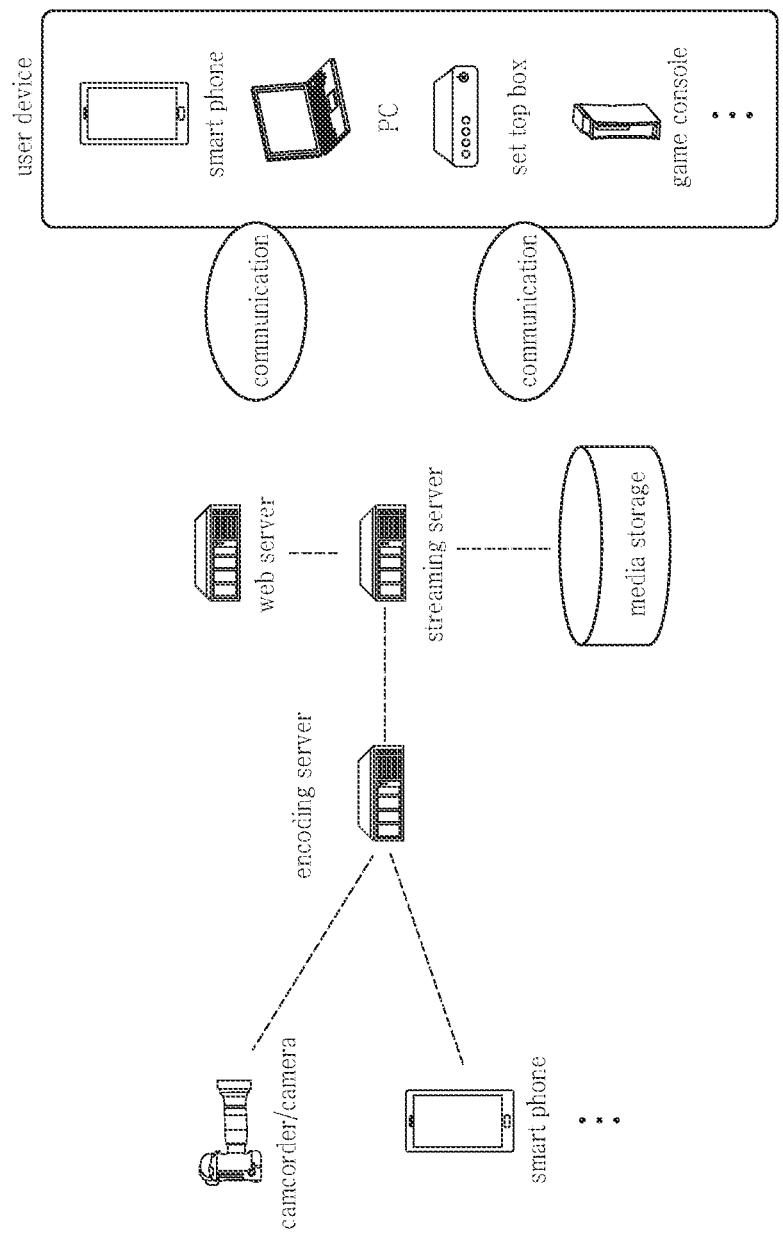
FIG. 15 illustrates a structural diagram of a contents streaming system to which the present disclosure is applied.

FIG. 15 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. An image decoding method performed by a decoding apparatus, the method comprising:
   obtaining a flag for whether a Picture Header (PH) Network Abstraction Layer (NAL) unit including a PH for a current picture is present;
   obtaining a Video Coding Layer (VCL) NAL unit including a slice header and slice data for a current slice in the current picture;
   obtaining the PH based on the flag; and
   decoding the current picture based on the PH, the slice header and the slice data,
   wherein based on the flag representing that the PH NAL unit is not present, the current picture includes only the current slice.

2. The method of claim 1, wherein based on the flag representing that the PH NAL unit is present, the PH is obtained from the PH NAL unit, and
   based on the flag representing that the PH NAL unit is not present, the PH is obtained from the VCL NAL unit including the slice header and the slice data.

3. The method of claim 1, wherein based on the flag representing that the PH NAL unit is not present, PH NAL units are not present for all pictures in a Coded Video Layer Sequence (CLVS) including the current picture.

4. The method of claim 3, wherein based on the flag representing that the PH NAL unit is not present, picture headers for all the pictures in the CLVS are included in VCL NAL units including slice headers of all the pictures.

5. The method of claim 1, wherein the flag is obtained in a Sequence Parameter Set (SPS).

6. An image encoding method performed by an encoding apparatus, the method comprising:
   generating a Video Coding Layer (VCL) Network Abstraction Layer (NAL) unit including a slice header and slice data for a slice in a current picture;
   determining whether a Picture Header (PH) NAL unit including a PH for the current picture is present;
   generating the PH and a flag for whether the PH NAL unit is present based on a result of the determination; and
   encoding image information including the VCL NAL unit, the PH and the flag,
   wherein based on the flag representing that the PH NAL unit is not present, the current picture includes only the current slice.

7. The method of claim 6, wherein based on the flag representing that the PH NAL unit is present, the PH is included in the PH NAL unit, and
   based on the flag representing that the PH NAL unit is not present, the PH is included in the VCL NAL unit including the slice header and the slice data.

8. The method of claim 6, wherein the flag is signaled in a Sequence Parameter Set (SPS).

9. The method of claim 6, wherein based on the flag representing that the PH NAL unit is not present, PH NAL units are not present for all pictures in a Coded Video Layer Sequence (CLVS) including the current picture.

10. The method of claim 9, wherein based on the flag representing that the PH NAL unit is not present, picture headers for all the pictures in the CLVS are included in VCL NAL units including slice headers of all the pictures.

11. A non-transitory computer-readable storage medium storing a bitstream generated by a method, the method comprising:
    generating a Video Coding Layer (VCL) Network Abstraction Layer (NAL) unit including a slice header and slice data for a slice in a current picture;
    determining whether a Picture Header (PH) NAL unit including a PH for the current picture is present;
    generating the PH and a flag for whether the PH NAL unit is present based on a result of the determination;
    encoding image information including the VCL NAL unit, the PH and the flag; and
    generating the bitstream including the image information,
    wherein based on the flag representing that the PH NAL unit is not present, the current picture includes only the current slice.

12. The computer-readable storage medium of claim 11, wherein based on the flag representing that the PH NAL unit is present, the PH is obtained from the PH NAL unit, and
    based on the flag representing that the PH NAL unit is not present, the PH is obtained from the VCL NAL unit including the slice header and the slice data.

* * * * *